US012420214B2

(12) United States Patent
Thomas et al.

(10) Patent No.: US 12,420,214 B2
(45) Date of Patent: Sep. 23, 2025

(54) METHODS TO PRODUCE PRODUCTS COMPRISING CANNABINOIDS

(71) Applicant: Natural Extraction Systems, LLC, Boulder, CO (US)

(72) Inventors: C. Russell Thomas, Boulder, CO (US); Matthew M. DePalo, Aurora, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 0 days.

(21) Appl. No.: 19/205,571

(22) Filed: May 12, 2025

(65) Prior Publication Data

US 2025/0269300 A1    Aug. 28, 2025

Related U.S. Application Data

(63) Continuation-in-part of application No. 17/267,279, filed as application No. PCT/US2019/045950 on Aug. 9, 2019, now Pat. No. 12,297,181, application No. 19/205,571, filed on May 12, 2025 is a continuation-in-part of application No. 18/810,180, filed on Aug. 20, 2024, which is a continuation of application No. 17/884,247, filed on Aug. 9, 2022, now Pat. No. 12,064,709, which is a continuation of application No. 17/141,058, filed on Jan. 4, 2021, now Pat. No. 11,406,913, which is a continuation of application No. 16/659,698, filed on Oct. 22, 2019, now Pat. No. 10,881,982, which is a continuation of application No. 16/184,574, filed on Nov. 8, 2018, now Pat. No. 10,456,708, application No. 19/205,571, filed on May 12, 2025 is a continuation-in-part of application No. 16/843,680, filed on Apr. 8, 2020, which is a continuation of application No. 16/098,265, filed on Nov. 1, 2018, now Pat. No. 10,617,974, application No. 19/205,571, filed on May 12, 2025 is a continuation-in-part of application No. 18/515,005, filed on Nov. 20, 2023, now Pat. No. 12,319,890, which is a continuation of application No. 17/333,728, filed on May 28, 2021, now Pat. No. 11,820,959, which is a continuation of application No. 16/465,735, filed on May 31, 2019, now Pat. No. 11,021,674, application No. 19/205,571, filed on May 12, 2025 is a continuation-in-part of application No. 18/328,547, filed on Jun. 2, 2023, which is a continuation of application No. 17/086,693, filed on Nov. 2, 2020, now Pat. No. 11,702,397, which is a continuation of application No. 16/271,783, filed on Feb. 9, 2019, now Pat. No. 10,822,320, application No. 19/205,571, filed on May 12, 2025 is a continuation-in-part of application No. 17/798,033, filed as application No. PCT/US2021/016976 on Feb. 6, 2021.

(60) Provisional application No. 62/803,408, filed on Feb. 8, 2019, provisional application No. 62/717,235, filed on Aug. 10, 2018, provisional application No. 62/971,742, filed on Feb. 7, 2020.

(51) Int. Cl.
| | |
|---|---|
| *A61K 36/00* | (2006.01) |
| *B01D 1/14* | (2006.01) |
| *B01D 3/34* | (2006.01) |
| *B01D 11/02* | (2006.01) |
| *C11B 1/10* | (2006.01) |
| *C11B 9/02* | (2006.01) |
| *B01D 11/00* | (2006.01) |

(52) U.S. Cl.
CPC ............. *B01D 11/02* (2013.01); *B01D 1/14* (2013.01); *B01D 3/343* (2013.01); *B01D 11/023* (2013.01); *B01D 11/028* (2013.01); *B01D 11/0288* (2013.01); *B01D 11/0296* (2013.01); *C11B 1/10* (2013.01); *C11B 9/027* (2013.01); *B01D 2011/007* (2013.01)

(58) Field of Classification Search
None
See application file for complete search history.

(56) References Cited

U.S. PATENT DOCUMENTS

| | | |
|---|---|---|
| 2,467,435 A | 4/1949 | Langhurst |
| 2,805,981 A | 9/1957 | Cavin |
| 3,270,437 A | 9/1966 | Lara |
| 4,227,997 A | 10/1980 | Shaddock |
| 4,279,824 A | 7/1981 | McKinney |
| 4,396,487 A | 8/1983 | Strumskis |
| 4,752,307 A | 6/1988 | Asmus |

(Continued)

FOREIGN PATENT DOCUMENTS

| | | |
|---|---|---|
| CA | 2472561 A1 | 8/2002 |
| CN | 201643760 U | 11/2010 |

(Continued)

OTHER PUBLICATIONS

Benmoussa, H. et al., "Enhanced solvent-free microwave extraction of Foeniculum vulgare Mill. essential oil seeds using double walled reactor," Arabian Journal of Chemistry, 2016, vol. 12, pp. 3863-3870.

(Continued)

*Primary Examiner* — Russell G Fiebig
(74) *Attorney, Agent, or Firm* — Douglas G. Metcalf

(57) ABSTRACT

Various aspects of this disclosure relate to methods to lower the activation energy of the cannabinoid decarboxylation reaction by performing the decarboxylation reaction in the gas phase. In some specific embodiments, the method relates to the decarboxylation of a cannabinoid performed in a short-path distillation apparatus or a thin-film distillation apparatus.

20 Claims, 7 Drawing Sheets

(56) References Cited

U.S. PATENT DOCUMENTS

| | | |
|---|---|---|
| 5,002,784 A | 3/1991 | Paré |
| 5,026,549 A | 6/1991 | Coutiere |
| 5,235,992 A | 8/1993 | Sensabaugh, Jr. |
| 5,408,924 A | 4/1995 | Arendt |
| 5,458,897 A | 10/1995 | Paré |
| 6,019,819 A | 2/2000 | Williams |
| 6,248,910 B1 | 6/2001 | Franke |
| 6,365,416 B1 | 4/2002 | Elsohy |
| 6,403,126 B1 | 6/2002 | Webster |
| 6,860,998 B1 | 3/2005 | Wilde |
| 7,001,502 B1 | 2/2006 | Satchwell |
| 7,001,629 B1 | 2/2006 | Mengal |
| 7,344,736 B2 | 3/2008 | Whittle |
| 7,622,140 B2 | 11/2009 | Whittle |
| 7,833,298 B2 | 11/2010 | Larnholm |
| 8,062,410 B2 | 11/2011 | Bullinger |
| 8,329,229 B2 | 12/2012 | Gonzalez |
| 8,343,553 B2 | 1/2013 | Hospodor |
| 8,445,034 B1 | 5/2013 | Coles, Jr. |
| 9,038,413 B2 | 5/2015 | Howard |
| 9,987,567 B1 | 6/2018 | Ko |
| 10,159,908 B2 | 12/2018 | Thomas |
| 10,195,159 B2 | 2/2019 | Whittle |
| 10,238,705 B2 | 3/2019 | Speier |
| 10,413,843 B2 | 9/2019 | Ko |
| 10,456,708 B2 | 10/2019 | Thomas |
| 10,596,486 B2 | 3/2020 | Nevitt |
| 10,617,974 B2 | 4/2020 | Thomas |
| 10,669,248 B2 | 6/2020 | Thomas |
| 10,806,707 B2 | 10/2020 | Finley |
| 10,822,320 B2 | 11/2020 | Thomas |
| 10,881,982 B2 | 1/2021 | Thomas |
| 11,643,402 B2 | 5/2023 | Thomas |
| 11,702,397 B2 | 7/2023 | Thomas |
| 12,297,181 B2 | 5/2025 | Thomas |
| 2002/0139097 A1 | 10/2002 | Brilmaker |
| 2004/0049059 A1 | 3/2004 | Mueller |
| 2004/0147767 A1 | 7/2004 | Whittle |
| 2004/0147769 A1 | 7/2004 | Davis |
| 2004/0187340 A1 | 9/2004 | Chemat |
| 2005/0042172 A1 | 2/2005 | Whittle |
| 2005/0172802 A1 | 8/2005 | Betting |
| 2009/0054711 A1 | 2/2009 | Lawrence |
| 2010/0119606 A1 | 5/2010 | Whittle |
| 2011/0133120 A1 | 6/2011 | McGhee |
| 2012/0012002 A1 | 1/2012 | Kaneko |
| 2012/0157719 A1 | 6/2012 | Teles |
| 2013/0240347 A1 | 9/2013 | Hackleman |
| 2014/0001027 A1 | 1/2014 | Balass |
| 2014/0113010 A1 | 4/2014 | Hospodor |
| 2014/0193303 A1 | 7/2014 | Ellis |
| 2014/0271940 A1 | 9/2014 | Wurzer |
| 2015/0068113 A1 | 3/2015 | Conner |
| 2015/0252286 A1 | 9/2015 | Scialdone |
| 2016/0038437 A1 | 2/2016 | Whittle |
| 2016/0053199 A1 | 2/2016 | Clodoveo |
| 2016/0228385 A1 | 8/2016 | Sievers |
| 2018/0000857 A1 | 1/2018 | Kotra |
| 2018/0078874 A1 | 3/2018 | Thomas |
| 2018/0125777 A1 | 5/2018 | Lindsay |
| 2018/0296617 A1 | 10/2018 | Rivas |
| 2019/0151171 A1 | 5/2019 | Johnson |
| 2020/0390838 A1 | 12/2020 | Kotra |
| 2023/0101492 A1 | 3/2023 | Thomas |
| 2023/0312502 A1 | 10/2023 | Thomas |
| 2024/0092752 A1 | 3/2024 | Thomas |

FOREIGN PATENT DOCUMENTS

| | | |
|---|---|---|
| CN | 101553702 B | 6/2012 |
| CN | 103357193 A | 10/2013 |
| CN | 105943615 A | 9/2016 |
| EP | 2644039 A1 | 10/2013 |
| EP | 3453397 A1 | 3/2019 |
| FR | 2742358 A1 | 6/1997 |
| GB | 635121 | 4/1950 |
| GB | 2372714 A | 9/2002 |
| GB | 2400320 A | 10/2004 |
| JP | 4388715 B2 | 11/2002 |
| JP | 4849578 B1 | 1/2012 |
| WO | 2002089945 A2 | 11/2002 |
| WO | 2014000077 A1 | 1/2014 |
| WO | 2015049585 A2 | 4/2015 |
| WO | 2015070167 A1 | 5/2015 |
| WO | 2016153347 A1 | 9/2016 |
| WO | 2016161420 A1 | 10/2016 |
| WO | 2017192527 A1 | 11/2017 |
| WO | 2018009514 A1 | 1/2018 |
| WO | 2018047190 A1 | 3/2018 |
| WO | 2018102711 A1 | 6/2018 |
| WO | 2019082187 A1 | 5/2019 |

OTHER PUBLICATIONS

Filly, A et al., "Solvent-free microwave extraction of essential oil from aromatic herbs: From laboratory pilot industrial scale," Food Chemistry, 2013, vol. 150, pp. 193-198.

Kanter et al., "Qualitative determination of delta9-tetrahydrocannabinol and delta9-tetrahydrocannabinolic acid in marihuana by high-pressure liquid chromatography" Journal of Chromatography, 1979, vol. 171, pp. 504-508.

Petrov, V.M. et al., "Microwave absorbing materials," Inorganic Materials, 2001, vol. 37, issue 2, pp. 93-98.

Veress et al., "Determination of cannabinoid acids by high-performance liquid chromatography of their neutral derivatives formed by thermal decarboxylation: I. Study of the decarboxylation process in open reactors," Journal of Chromatography, 1990, vol. 520, pp. 339-347.

Wang, Z. et al., "Improved solvent-free microwave extraction of essential oil from dried *Cuminum cyminum* L. and Zanthoxylum bungeanum Maxim," Journal of Chromatography A, 2006, vol. 1102, pp. 11-17.

Koturević et al., "Rapid Method for the Extraction of Cannabionoids from Cannabis Sativa Using Microwave Heating Technique," Journal of Criminalistics and Law, 2014, vol. 3, pp. 109-123.

METHODS TO PRODUCE PRODUCTS COMPRISING CANNABINOIDS

CROSS-REFERENCE TO RELATED APPLICATIONS

This patent application is a continuation in part of U.S. patent application Ser. No. 17/267,279, which granted as U.S. Pat. No. 12,297,181, and which is the U.S. National Stage under 35 § U.S.C. 371 of International Application No. PCT/US19/45950, filed Aug. 9, 2019, which claims priority to U.S. Patent Application No. 62/803,408, filed Feb. 8, 2019, and U.S. Patent Application No. 62/717,235, filed Aug. 10, 2018, each of which is incorporated by reference in its entirety.

This patent application also claims priority to U.S. patent application Ser. No. 18/810,180, which is a continuation of U.S. patent application Ser. No. 17/884,247, which granted as U.S. Pat. No. 12,064,709, which is a continuation of U.S. patent application Ser. No. 17/141,058, which granted as U.S. Pat. No. 11,406,913, which is a continuation of U.S. patent application Ser. No. 16/659,698, which granted as U.S. Pat. No. 10,881,982, and which is a continuation of U.S. patent application Ser. No. 16/184,574, which granted as U.S. Pat. No. 10,456,708, each of which is incorporated by reference in its entirety.

This patent application also claims priority to U.S. patent application Ser. No. 16/843,680, which is a continuation of U.S. patent application Ser. No. 16/098,265, which granted as U.S. Pat. No. 10,617,974, each of which is incorporated by reference in its entirety.

This patent application also claims priority to U.S. patent application Ser. No. 18/515,005, which is a continuation of U.S. patent application Ser. No. 17/333,728, which granted as U.S. Pat. No. 11,820,959, and which is a continuation of U.S. patent application Ser. No. 16/465,735, which granted as U.S. Pat. No. 11,021,674, each of which is incorporated by reference in its entirety.

This patent application also claims priority to U.S. patent application Ser. No. 18/328,547, which is a continuation of U.S. patent application Ser. No. 17/086,693, which granted as U.S. Pat. No. 11,702,397, which is a continuation of U.S. patent application Ser. No. 16/271,783, which granted as U.S. Pat. No. 10,822,320, and which claims priority to U.S. Provisional Patent Application No. 62/803,409, filed Feb. 8, 2019, each of which is incorporated by reference in its entirety.

This patent application also claims priority to U.S. patent application Ser. No. 17/798,033, which is the U.S. National Stage under 35 § U.S.C. 371 of International Application No. PCT/US21/16976, filed Feb. 6, 2021, which claims priority to U.S. Provisional Patent Application No. 62/971,742, filed Feb. 7, 2020, each of which is incorporated by reference in its entirety.

BACKGROUND

Industrial hemp and other forms of cannabis comprise a variety of different cannabinoids, which predominantly each contain a carboxyl group. These cannabinoid carboxylic acids bind the human cannabinoid receptors with relatively low affinity. The production of industrial hemp extract, therapeutic pharmaceuticals, and psychoactive drugs from cannabis therefore generally utilizes a decarboxylation step, which historically involved prolonged heating. This heating generally resulted in thermal degradation products and other undesirable chemical modifications. Improved methods to decarboxylate cannabinoids remain desirable.

SUMMARY

The present disclosure describes methods to rapidly decarboxylate cannabinoids without generating appreciable quantities of undesirable side products such as cannabinol (CBN). The methods typically comprise rapidly heating and vaporizing cannabinoids and then contacting cannabinoid vapor with a heat sink immediately after vaporizing the cannabinoids to condense the cannabinoids. The inventors identified parameters that result in marked improvements over prior art methods: (1) the cannabinoids should be present in a composition having a high surface-area-to volume ratio, (2) the cannabinoids should be present in the composition at a relatively high concentration, and (3) cannabinoid vapor should be condensed immediately after vaporization. High surface area and high relative cannabinoid concentration ensures that the energy used to vaporize the cannabinoids favors vaporization of the cannabinoids relative to the heating and/or vaporization of other molecules. Rapid condensation of cannabinoid vapor minimizes contact between cannabinoid vapor and other heated molecules. One distinguishing feature of this disclosure over the prior art is the optimization of energy transfer (i.e., by heating and condensing) instead of the optimization of temperature.

Vaporizing a carboxylated cannabinoid does not necessarily result in decarboxylation, and vaporization often results in undesirable pyrolysis. When the foregoing parameters are optimized as described herein, carboxylated cannabinoids can be both decarboxylated and vaporized at temperatures near their boiling points thereby allowing simultaneous decarboxylation and purification and minimizing undesirable pyrolysis.

Various aspects of this disclosure relate to improved methods to chemically modify cannabinoids by decarboxylation, e.g., the conversion of tetrahydrocannabinolic acid (THCA) into tetrahydrocannabinol (THC); the conversion of cannabidiolic acid (CBDA) into cannabidiol (CBD); and/or the conversion of tetrahydrocannabivarin carboxylic acid (THCVA) into tetrahydrocannabivarin (THCV). Such methods may be used to produce products comprising one or more cannabinoids such as THC, CBD, and, THCV.

In some embodiments, the method comprises (A) providing a composition comprising cannabinoids, in which the cannabinoids comprise a native cannabinoid molecule, the native cannabinoid molecule comprises a carboxyl group, and the native cannabinoid molecule is in a liquid phase or a solid phase; (B) contacting the composition with sufficient energy to convert the native cannabinoid molecule into (i) a carbon dioxide molecule and (ii) a modified cannabinoid molecule in a gas phase; (C) contacting the modified cannabinoid molecule with a heat sink to condense the modified cannabinoid molecule into a condensed cannabinoid molecule in a liquid distillate; and (D) collecting the liquid distillate. In some specific embodiments, the method comprises (A) providing a composition comprising cannabinoids, in which (i) the surface-area-to-volume ratio of the composition is greater than 1000 per meter; (ii) the composition comprises at least 1% by weight cannabinoids; and (iii) at least 30% of the cannabinoids of the composition comprise a carboxyl group; (B) heating and vaporizing cannabinoids of the composition to convert cannabinoids of the composition into cannabinoid vapor within a gas phase; (C) contacting the gas phase with a heat sink to convert cannabinoid vapor into condensed cannabinoids, in which (i) cannabinoid vapor is converted into condensed cannabinoids less than 360 seconds after the cannabinoid vapor is vaporized; (ii) at least 50% of the cannabinoids of the composition are converted into condensed cannabinoids by mole; (iii) less than 5% by weight of the cannabinoids of the condensed cannabinoids are cannabinol; and (iv) at least 75% of the condensed cannabinoids lack a carboxyl group; and (D) collecting a distillate comprising the condensed cannabinoids.

In some embodiments, the native cannabinoid molecule is tetrahydrocannabinolic acid, the modified cannabinoid molecule is tetrahydrocannabinol, and the condensed cannabinoid molecule is tetrahydrocannabinol.

In some embodiments, the native cannabinoid molecule is tetrahydrocannabivarinic acid, the modified cannabinoid molecule is tetrahydrocannabivarin, and the condensed cannabinoid molecule is tetrahydrocannabivarin.

In some embodiments, the native cannabinoid molecule is cannabidiolic acid, the modified cannabinoid molecule is cannabidiol, and the condensed cannabinoid molecule is cannabidiol.

In some embodiments, the method comprises providing a composition comprising cannabinoids. In some specific embodiments, the method comprises providing a composition comprising cannabinoids, wherein the composition has a surface area. In some very specific embodiments, the method comprises providing a composition comprising cannabinoids, wherein the composition has a surface-area-to-volume ratio of greater than 1000 per meter ($m^{-1}$).

In some embodiments, the composition comprises less than 30% by weight water. In some specific embodiments, the composition may comprise less than 25%, 20%, 15%, 12%, or 10% by weight water. In some very specific embodiments, the composition comprising cannabinoids comprises less than 15% water by weight.

In some embodiments, the composition can be a liquid such as an oil. In some specific embodiments, the composition comprises an oil, and the oil comprises the cannabinoids of the composition.

In some embodiments, the composition comprises a liquid. In some specific embodiments, the composition comprises a liquid, and the liquid is an oil.

In some embodiments, the composition is a liquid such as an oil.

In some embodiments, a composition comprises an extracted oil from the genus Cannabis.

In some embodiments, a method comprises providing a composition comprising cannabinoids, in which the cannabinoids comprise a native cannabinoid molecule, the native cannabinoid molecule comprises a carboxyl group, and the native cannabinoid molecule is in a liquid phase.

In some embodiments, the cannabinoids comprise a native cannabinoid molecule. In some specific embodiments, the cannabinoids comprise a native cannabinoid molecule, and the native cannabinoid molecule comprises a carboxyl group. In some even more specific embodiments, the cannabinoids comprise a native cannabinoid molecule, the native cannabinoid molecule comprises a carboxyl group, and the native cannabinoid molecule is tetrahydrocannabinolic acid (THCA), cannabidiolic acid (CBDA), or tetrahydrocannabivarin carboxylic acid (THCV). In some very specific embodiments, the native cannabinoid molecule is tetrahydrocannabinolic acid (THCA).

The composition preferably comprises at least 1% by weight cannabinoids. In some specific embodiments, the composition may comprise at least 2% 3%, 4%, 6%, 7%, 8%, 9%, 10%, 11%, 12%, 13%, 14%, or 15% by weight cannabinoids. In some even more specific embodiments, the composition may comprise at least 2%, 3%, 4%, 5%, 6%, 7%, 8%, 9%, 10%, 11%, 12%, 13%, 14%, 15%, 20%, or 25% by weight cannabinoids selected from tetrahydrocannabinolic acid (THCA), cannabidiolic acid (CBDA), tetrahydrocannabivarin carboxylic acid (THCVA), tetrahydrocannabinol (THC), cannabidiol (CBD), and tetrahydrocannabivarin (THCV). In some very specific embodiments, the composition may comprise at least 5% by weight cannabinoids selected from tetrahydrocannabinolic acid (THCA), cannabidiolic acid (CBDA), tetrahydrocannabivarin carboxylic acid (THCVA), tetrahydrocannabinol (THC), cannabidiol (CBD), and tetrahydrocannabivarin (THCV). A composition of this disclosure may comprise cannabinoids other than THCA, CBDA, THCVA, THC, CBD, and THCV (such as cannabigerol), but only THCA, CBDA, THCVA, THC, CBD, and THCV are considered to determine whether a composition comprises at least 5% by weight of the cannabinoids selected from THCA, CBDA, THCVA, THC, CBD, and THCV.

In some embodiments, the composition comprises a native cannabinoid molecule at a concentration of at least 1% by weight such as at least 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 55%, 60%, 65%, 70%, 75%, 80%, 85%, 90%, or 95%.

In some embodiments, the composition comprises a native cannabinoid molecule at a concentration of 0.5% to 99.9% by weight such as 0.5% to 25%, 5% to 30%, 10% to 35%, 15% to 40%, 20% to 45%, 25% to 50%, 30% to 55%, 35% to 60%, 40% to 65%, 45% to 70%, 50% to 75%, 55% to 80%, 60% to 85%, 65% to 90%, 70% to 95%, 75% to 99.9%, 0.5% to 5%, 1% to 10%, 5% to 15%, 10% to 20%, 15% to 25%, 20% to 30%, 25% to 35%, 30% to 40%, 35% to 45%, 40% to 50%, 45% to 55%, 50% to 60%, 55% to 65%, 60% to 70%, 65% to 75%, 70% to 80%, 75% to 85%, 80% to 90%, 85% to 95%, or 90% to 99.9%.

In some embodiments, the composition may comprise at least 1% by weight tetrahydrocannabinolic acid (THCA). In some specific embodiments, the composition may comprise at least 2%, 3%, 4%, 5%, 6%, 7%, 8%, 9%, 10%, 11%, 12%, 13%, 14%, 15%, 20%, or 25% by weight THCA.

In some embodiments, the composition comprises THCA at a concentration of at least 1% by weight such as at least 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 55%, 60%, 65%, 70%, 75%, 80%, 85%, 90%, or 95%.

In some embodiments, the composition comprises THCA at a concentration of 0.5% to 99.9% by weight such as 0.5% to 25%, 5% to 30%, 10% to 35%, 15% to 40%, 20% to 45%, 25% to 50%, 30% to 55%, 35% to 60%, 40% to 65%, 45% to 70%, 50% to 75%, 55% to 80%, 60% to 85%, 65% to 90%, 70% to 95%, 75% to 99.9%, 0.5% to 5%, 1% to 10%, 5% to 15%, 10% to 20%, 15% to 25%, 20% to 30%, 25% to 35%, 30% to 40%, 35% to 45%, 40% to 50%, 45% to 55%, 50% to 60%, 55% to 65%, 60% to 70%, 65% to 75%, 70% to 80%, 75% to 85%, 80% to 90%, 85% to 95%, or 90% to 99.9%.

In some embodiments, the method may comprise contacting the composition with a heated surface. The temperature of the heated surface may be, for example, about 105° C. to about 230° C.

A method typically comprises heating and vaporizing cannabinoids of the composition, thereby converting cannabinoids of the composition into cannabinoid vapor within a gas phase. Typically at least 50%, 60%, 70%, 75%, 80%, 85%, 90%, or 95% of the cannabinoids of the composition are vaporized. In some specific embodiments, about 90 to 100% of the cannabinoids of the composition are vaporized.

Heating and vaporizing the cannabinoids may comprise convection, conduction, or radiation. In some specific embodiments, the method comprises heating the cannabinoids of the composition by conduction.

In some embodiments, the method comprises irradiating the composition, convectively heating the composition, or conductively heating the composition, in which contacting the composition with sufficient energy comprises one or more of irradiating the composition, convectively heating the composition, or conductively heating the composition. In some specific embodiments, the method comprises conductively heating the composition, in which contacting the composition with sufficient energy comprises conductively heating the composition.

In some embodiments, contacting the composition with the sufficient energy comprises conductively heating the composition.

In some embodiments, heating the cannabinoids of the composition by conduction comprises contacting the composition with sufficient energy to convert the native cannabinoid molecule into (A) a carbon dioxide molecule and (B) the modified cannabinoid molecule in the gas phase.

In some embodiments, the method comprises providing a distillation apparatus. In some specific embodiments, the method comprises providing a distillation apparatus, wherein the distillation apparatus is a thin-film evaporator or a short-path distillation apparatus. In some very specific embodiments, the method comprises providing a distillation apparatus, wherein the distillation apparatus is a thin-film evaporator and a short-path distillation apparatus.

An example of a short-path distillation apparatus is the Short Path Distillation Plant VKL 70-5 (Root Sciences, Washington, United States), which those of ordinary skill in the art will immediately recognize to be a wiped-film short-path distillation apparatus.

In some specific embodiments, a method comprises conductively heating a composition such as in an oven, retort, distillation still, falling film evaporator, or short-path distillation apparatus. In some very specific embodiments, a method comprises coating a surface of a thin-film evaporator or short-path distillation apparatus with a composition at a surface-area-to-volume ratio of the composition that is greater than 500 per meter such as greater than 600 per meter, 700 per meter, 800 per meter, 900 per meter, 1000 per meter, 2000 per meter, 3000 per meter, 4000 per meter, or 5000 per meter.

In some embodiments, the composition is shaped to expose its surface area to a gas phase such as by coating a surface with the composition such as in a short-path distillation apparatus.

In some embodiments, contacting the composition with the heated surface comprises coating the heated surface with the composition.

In some embodiments, the method comprises coating a surface or heated surface with the composition comprising cannabinoids at a surface-area-to-volume ratio of the composition that is greater than 500 per meter prior to converting a cannabinoid molecule in a liquid phase into a vaporized cannabinoid molecule in a gas phase, such as greater than 600 per meter, 700 per meter, 800 per meter, 900 per meter, 1000 per meter, 2000 per meter, 3000 per meter, 4000 per meter, or 5000 per meter. In some specific embodiments, the composition is contacted with sufficient energy to convert a cannabinoid molecule in a liquid phase into a vaporized cannabinoid molecule in a gas phase while the composition is coated on a surface or heated surface at a surface-area-to-volume ratio of the composition that is greater than 500 per meter such as greater than 600 per meter, 700 per meter, 800 per meter, 900 per meter, 1000 per meter, 2000 per meter, 3000 per meter, 4000 per meter, or 5000 per meter.

In some embodiments, the method comprises coating a surface or heated surface with the composition comprising cannabinoids at a surface-area-to-volume ratio of the composition that is greater than 500 per meter prior to converting a native cannabinoid molecule into a carbon dioxide molecule and a modified cannabinoid molecule, such as greater than 600 per meter, 700 per meter, 800 per meter, 900 per meter, 1000 per meter, 2000 per meter, 3000 per meter, 4000 per meter, or 5000 per meter. In some specific embodiments, the composition is contacted with sufficient energy to convert a native cannabinoid molecule into (i) a carbon dioxide molecule and (ii) a modified cannabinoid molecule in a gas phase while the composition is coated on a surface or heated surface at a surface-area-to-volume ratio of the composition that is greater than 500 per meter such as greater than 600 per meter, 700 per meter, 800 per meter, 900 per meter, 1000 per meter, 2000 per meter, 3000 per meter, 4000 per meter, or 5000 per meter.

In some embodiments, the surface area of the composition is accessible to a gas phase or vacuum when the cannabinoids of the composition are vaporized.

In some very specific embodiments, a gas phase lacks sulfur dioxide at a concentration greater than 5 parts per million by volume.

In some embodiments, contacting the composition with a heated surface and exposing the surface area of the composition to a vacuum converts the native cannabinoid molecule into a modified cannabinoid molecule in a gas phase, wherein either the native cannabinoid molecule is tetrahydrocannabinolic acid (THCA) and the modified cannabinoid molecule is tetrahydrocannabinol (THC); the native cannabinoid molecule is cannabidiolic acid (CBDA) and the modified cannabinoid molecule is cannabidiol (CBD); or the native cannabinoid molecule is tetrahydrocannabivarin carboxylic acid (THCVA) and the modified cannabinoid molecule is tetrahydrocannabivarin (THCV). In some specific embodiments, the native cannabinoid molecule is tetrahydrocannabinolic acid (THCA) and the modified cannabinoid molecule is tetrahydrocannabinol (THC).

In some embodiments, the method converts at least 75% of the tetrahydrocannabinolic acid (THCA) of the composition comprising cannabinoids into tetrahydrocannabinol (THC).

In some embodiments, the cannabinoid vapor is condensed immediately after vaporization. In some specific embodiments, the cannabinoid vapor is converted into condensed cannabinoids less than 360 seconds after the cannabinoid vapor is vaporized. In some very specific embodiments, the cannabinoid vapor may be converted into condensed cannabinoids less than 360, 300, 240, 180, 120, 60, 30, 10, 9, 8, 7, 6, 5, 4, 3, 2, or 1 second(s) after the cannabinoid vapor is vaporized. For example, the cannabinoid vapor may be converted into condensed cannabinoids less than 60 seconds after the cannabinoid vapor is vaporized.

In some embodiments, the method comprises contacting the modified cannabinoid molecule with a heat sink to condense the modified cannabinoid molecule into a condensed cannabinoid molecule in a liquid distillate.

In some embodiments, the method comprises contacting a vaporized cannabinoid molecule with a heat sink to condense the vaporized cannabinoid molecule into a condensed cannabinoid molecule in a liquid distillate.

In some embodiments, a heat sink has a surface area greater than 10% of the surface area of a composition comprising cannabinoids.

In some embodiments, contacting the modified cannabinoid molecule with the heat sink comprises directing the modified cannabinoid molecule through a fluid-cooled condenser.

In some embodiments, a method comprises contacting a modified cannabinoid molecule with a heat sink less than 360, 300, 240, 180, 120, 90, 60, 45, 30, 20, 15, 10, 9, 8, 7, 6, 5, 4, 3, or 2 seconds after contacting the composition with sufficient energy to convert the native cannabinoid molecule into (i) a carbon dioxide molecule and (ii) the modified cannabinoid molecule in a gas phase. In some specific embodiments, the method comprises contacting the modified cannabinoid molecule with a heat sink less than 60 seconds after contacting the composition with sufficient energy to convert the native cannabinoid molecule into (i) a carbon dioxide molecule and (ii) the modified cannabinoid molecule in a gas phase. In some specific embodiments, the method comprises contacting the modified cannabinoid molecule with a heat sink less than 10 seconds after contacting the composition with sufficient energy to convert the native cannabinoid molecule into (i) a carbon dioxide molecule and (ii) the modified cannabinoid molecule in a gas phase. In some specific embodiments, the method comprises contacting the modified cannabinoid molecule with a heat sink less than 5 seconds after contacting the composition with sufficient energy to convert the native cannabinoid molecule into (i) a carbon dioxide molecule and (ii) the modified cannabinoid molecule in a gas phase.

In some embodiments, the method comprises condensing a vaporized cannabinoid molecule into a condensed cannabinoid molecule less than 360, 300, 240, 180, 120, 90, 60, 45, 30, 20, 15, 10, 9, 8, 7, 6, 5, 4, 3, or 2 seconds after converting a cannabinoid molecule in a liquid phase into the vaporized cannabinoid molecule in a gas phase. In some specific embodiments, the method comprises condensing a vaporized cannabinoid molecule into a condensed cannabinoid molecule less than 60 seconds after converting a cannabinoid molecule in a liquid phase into the vaporized cannabinoid molecule in a gas phase. In some specific embodiments, the method comprises condensing a vaporized cannabinoid molecule into a condensed cannabinoid molecule less than 10 seconds after converting a cannabinoid molecule in a liquid phase into the vaporized cannabinoid molecule in a gas phase. In some specific embodiments, the method comprises condensing a vaporized cannabinoid molecule into a condensed cannabinoid molecule less than 5 seconds after converting a cannabinoid molecule in a liquid phase into the vaporized cannabinoid molecule in a gas phase.

In some embodiments, the method comprises condensing the modified cannabinoid molecule into the condensed cannabinoid molecule less than 360 seconds after contacting the composition with the sufficient energy.

In some embodiments, the method comprises condensing a modified cannabinoid molecule into a condensed cannabinoid molecule less than 360, 300, 240, 180, 120, 90, 60, 45, 30, 20, 15, 10, 9, 8, 7, 6, 5, 4, 3, or 2 seconds after contacting the composition with sufficient energy to convert a native cannabinoid molecule into (i) a carbon dioxide molecule and (ii) the modified cannabinoid molecule in a gas phase. In some specific embodiments, the method comprises condensing a modified cannabinoid molecule into a condensed cannabinoid molecule less than 60 seconds after contacting the composition with sufficient energy to convert a native cannabinoid molecule into (i) a carbon dioxide molecule and (ii) the modified cannabinoid molecule in a gas phase. In some specific embodiments, the method comprises condensing a modified cannabinoid molecule into a condensed cannabinoid molecule less than 10 seconds after contacting the composition with sufficient energy to convert a native cannabinoid molecule into (i) a carbon dioxide molecule and (ii) the modified cannabinoid molecule in a gas phase. In some specific embodiments, the method comprises condensing a modified cannabinoid molecule into a condensed cannabinoid molecule less than 5 seconds after contacting the composition with sufficient energy to convert a native cannabinoid molecule into (i) a carbon dioxide molecule and (ii) the modified cannabinoid molecule in a gas phase. Cannabinoid vapor can be converted into condensed cannabinoids about 2 seconds after vaporization with excellent yields of decarboxylated cannabinoids when a composition comprising cannabinoids has a surface-area-to-volume ratio and water content as described in this disclosure.

The method preferably comprises collecting a distillate comprising the condensed cannabinoids. The distillate is typically a liquid.

In some embodiments, the method comprises collecting a liquid distillate.

In some embodiments, the condensed cannabinoids comprise tetrahydrocannabinol (THC), tetrahydrocannabivarin (THCV), and/or cannabidiol (CBD). In some specific embodiments, the condensed cannabinoids may comprise at least 80%, 85%, 90%, or 95% THC, THCV, and/or CBD as a percentage by weight of total cannabinoids. In some very specific embodiments, the condensed cannabinoids may comprise at least 80%, 85%, 90%, or 95% THC as a percentage by weight of total cannabinoids. In some very specific embodiments, the condensed cannabinoids may comprise at least 0.1%, 0.2%, 0.3%, 0.4%, 0.5%, 0.6%, 0.7%, 0.8%, 0.9%, 1.0%, 1.2%, 1.4%, 1.5%, or 2.0% THCV as a percentage by weight of total cannabinoids.

In some embodiments, the condensed cannabinoids comprise tetrahydrocannabinol (THC).

In some embodiments, the condensed cannabinoids comprise tetrahydrocannabivarin (THCV).

In some embodiments, the condensed cannabinoids comprise cannabidiol (CBDA).

In some embodiments, the condensed cannabinoids comprise cannabichromene (CBC).

In some embodiments, the condensed cannabinoids comprise cannabicyclol (CBL).

In some embodiments, the condensed cannabinoids comprise cannabinol (CBN).

In some embodiments, the condensed cannabinoids comprise delta-8-tetrahydrocannabinol (Δ8-THC).

In some embodiments, the condensed cannabinoids comprise cannabivarin (CBV).

The condensed cannabinoids preferably comprise less than 10% cannabinol (CBN) as a percentage by weight of total cannabinoids such as less than 5% CBN. In some embodiments, the condensed cannabinoids may comprise less than 4%, 3%, or 2% CBN as a percentage by weight of total cannabinoids. In some specific embodiments, the condensed cannabinoids may comprise less than 1% by weight CBN as a percentage by weight of total cannabinoids.

In some embodiments, the condensed cannabinoids are selected from tetrahydrocannabinol (THC), tetrahydrocannabivarin (THCV), cannabidiol (CBD), and cannabinol (CBN). In some specific embodiments, the condensed cannabinoids are selected from THC, THCV, CBD, and CBN; and the condensed cannabinoids comprise at least THC and CBN. In some very specific embodiments, the condensed cannabinoids are selected from THC, THCV, CBD, and CBN; the condensed cannabinoids comprise at least THC and CBN; and the condensed cannabinoids comprise less than 2 percent CBN by weight (such as less than 1% by weight).

In some embodiments, the condensed cannabinoids comprise cannabinol (CBN), cannabicyclol (CBL), and cannabivarin (CBV) at a total concentration of less than 10% by weight relative to the total weight of cannabinoids in the condensed cannabinoids.

In some embodiments, the composition comprises a starting proportion of cannabinol (CBN) to the cannabinoids of the composition; the distillate comprises an ending proportion of cannabinol (CBN) to the condensed cannabinoids; and the method is performed to result in a ratio of the starting proportion to the ending proportion that is greater than 1:2.

In some embodiments, a method comprises producing a liquid distillate comprising cannabinol at a concentration less than 2%, 1.5%, 1%, 0.8%, 0.5%, 0.2%, or 0.1% by weight.

In some specific embodiments, a method comprises producing a liquid distillate comprising one or both of CBD and THC at a concentration greater than 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 55%, 60%, 65%, 70%, 75%, 80%, 85%, 90%, or 95% by weight and cannabinol at a concentration less than 2%, 1.5%, 1%, 0.8%, 0.5%, 0.2%, or 0.1% by weight.

In some embodiments, a method comprises producing a liquid distillate comprising one or both of cannabidiol (CBD) and tetrahydrocannabinol (THC) at a concentration greater than 60% by weight and cannabinol (CBN) at a concentration less than 1% by weight. In some specific embodiments, a method comprises producing a liquid distillate comprising one or both of cannabidiol (CBD) and tetrahydrocannabinol (THC) at a concentration greater than 60% by weight and cannabinol (CBN) at a concentration less than 0.5% by weight. In some even more specific embodiments, a method comprises producing a liquid distillate comprising one or both of cannabidiol (CBD) and tetrahydrocannabinol (THC) at a concentration greater than 60% by weight and cannabinol (CBN) at a concentration less than 0.2% by weight. In some very specific embodiments, a method comprises producing a liquid distillate comprising one or both of cannabidiol (CBD) and tetrahydrocannabinol (THC) at a concentration greater than 60% by weight and cannabinol (CBN) at a concentration less than 0.1% by weight.

In some embodiments, a method comprises producing a liquid distillate comprising one or both of cannabidiol (CBD) and tetrahydrocannabinol (THC) at a concentration greater than 70% by weight and cannabinol (CBN) at a concentration less than 1% by weight. In some specific embodiments, a method comprises producing a liquid distillate comprising one or both of cannabidiol (CBD) and tetrahydrocannabinol (THC) at a concentration greater than 70% by weight and cannabinol (CBN) at a concentration less than 0.5% by weight. In some even more specific embodiments, a method comprises producing a liquid distillate comprising one or both of cannabidiol (CBD) and tetrahydrocannabinol (THC) at a concentration greater than 70% by weight and cannabinol (CBN) at a concentration less than 0.2% by weight. In some very specific embodiments, a method comprises producing a liquid distillate comprising one or both of cannabidiol (CBD) and tetrahydrocannabinol (THC) at a concentration greater than 70% by weight and cannabinol (CBN) at a concentration less than 0.1% by weight.

The method may further comprise producing a product from the distillate.

The product may comprise cannabinoids of the condensed cannabinoids at a concentration of at least 10% by weight such as at least 20%, 30%, 40%, 50%, 60%, 70%, 80%, 85%, 90%, or 95% by weight.

In some embodiments, the method comprises providing a vaporizer cartridge comprising a chamber and a heating element and filling the chamber of the vaporizer cartridge with at least a portion of the distillate to create thermal communication between the heating element and the portion of the distillate. The chamber may comprise, for example, one or more walls that comprise glass, plastic, and/or metal. Walls that are at least partially transparent may advantageously allow visualization of a fill level of distillate within the chamber. A lower portion of the vaporizer cartridge may seal a lower end of the chamber, for example, by plugging the lower end of the chamber. One or more gaskets (such as one or more rubber, silicone, or neoprene gaskets) may optionally be used between the lower portion of the vaporizer cartridge and one or more walls of the chamber to seal the lower end of the chamber. One or more walls of the chamber may also be affixed to the lower portion of the vaporizer cartridge, for example, with adhesive and/or welding, and/or one or more walls of the chamber may be continuous with the lower portion of the vaporizer cartridge. The heating element of the vaporizer cartridge may either (i) extend into the chamber, (ii) form one or more walls of the chamber, or (iii) be positioned in thermal communication with either the lower portion of the vaporizer cartridge or one or more walls of the chamber to allow thermal communication between the heating element and distillate within the chamber. The heating element may optionally be either integrated into or attached onto either the lower portion or one or more walls of the vaporizer cartridge. Integrating or attaching the heating element to or near the lower portion of the vaporizer cartridge can facilitate the gravity flow of distillate within the chamber toward the heating element to allow for thermal communication between the heating element and the distillate. The heating element may comprise a heating coil that comprises a metal wire such as an iron-chromium-aluminum alloy (e.g., Kanthal®), nickel-chromium alloy, or stainless steel wire that converts electricity to heat. A heating coil may optionally be embedded within ceramic of the heating element to provide an even distribution of heat. The heating element is typically configured to vaporize distillate of the chamber and may comprise (i) one or more cavities that allow thermal communication between the heating element and an amount of distillate to be vaporized and/or (ii) a thermal barrier that inhibits thermal communication between the heating element and the remaining distillate to inhibit thermal degradation of the remaining distillate. The lower portion of the vaporizer cartridge may comprise a connector to create and maintain electrical communication between the heating element and a battery. The connector may comprise a threaded connector (e.g., a 510- or 810-threaded connector), a mechanical connector (e.g., a snap-fit connector), or a magnetic connector. Such connectors generally create and maintain electrical communication between conductive interfaces (e.g., metal interfaces) by creating and maintaining physical contact between the conductive interfaces. In some embodiments, the vaporizer cartridge is integrated into a vaporizer that comprises a battery, and two or more wires and/or leads create and maintain electrical communication between the heating element and the battery. Suitable batteries include lithium-ion batteries that operate at 3.7 volts. An upper portion of the vaporizer cartridge may seal an upper end of the chamber, for example, by plugging the upper end of the chamber. One or more gaskets may optionally be used between the upper portion of the vaporizer cartridge and one or more walls of the chamber to seal the upper end of the chamber. One or more walls of the chamber may also be affixed to the upper portion of the vaporizer cartridge, for example, with adhesive and/or welding, and/or one or more walls of the chamber may be continuous with the upper portion of the vaporizer cartridge. The upper portion of the vaporizer cartridge may comprise a mouthpiece that has an opening. Positioning the mouthpiece on or near the upper portion of the vaporizer cartridge can inhibit the gravity flow of liquid distillate toward the mouthpiece, which might otherwise obstruct the opening. The vaporizer cartridge may comprise an air inlet that is distal from the mouthpiece and in fluid communication with the mouthpiece to allow airflow from the air inlet, through the vaporizer cartridge, and to the opening of the mouthpiece. The heating element, for example, may comprise a lumen in fluid communication with both the air inlet and the opening of the mouthpiece such that vacuum applied to the mouthpiece draws air through the lumen from the air inlet. The lumen may be in fluid communication with distillate within the chamber (optionally through one or more cavities of the heating element) such that cannabinoid vapor may enter the lumen from the chamber (optionally from or through the one or more cavities), mix with air within the lumen, and exit the opening of the mouthpiece. Those of ordinary skill in the art will immediately recognize that any number of combinations of the foregoing will allow thermal communication between the heating element of the vaporizer cartridge and distillate within the chamber of the vaporizer cartridge such that the heating element can vaporize distillate within the chamber and vacuum applied to the opening of the mouthpiece can draw vaporized distillate from the chamber.

Various aspects of this disclosure relate to a method to chemically modify a cannabinoid molecule, comprising: providing a composition comprising cannabinoids, in which the cannabinoids comprise a native cannabinoid molecule, the native cannabinoid molecule comprises a carboxyl group, and the native cannabinoid molecule is in a liquid phase or a solid phase; contacting the composition with sufficient energy to convert the native cannabinoid molecule into (i) a carbon dioxide molecule and (ii) a modified cannabinoid molecule in a gas phase; contacting the modified cannabinoid molecule with a heat sink to condense the modified cannabinoid molecule into a condensed cannabinoid molecule in a liquid distillate; and collecting the liquid distillate.

In some embodiments, contacting a composition with sufficient energy to convert a native cannabinoid molecule into (i) a carbon dioxide molecule and (ii) a modified cannabinoid molecule in a gas phase comprises contacting the composition with 0.0004 kilowatt hours to 0.04 kilowatt hours of energy per gram of the composition. In some specific embodiments, contacting a composition with sufficient energy to convert a native cannabinoid molecule into (i) a carbon dioxide molecule and (ii) a modified cannabinoid molecule in a gas phase comprises contacting the composition with 0.0004 kilowatt hours to 0.004 kilowatt hours of energy per gram of the composition.

In some embodiments, contacting a composition with sufficient energy to convert a native cannabinoid molecule into (i) a carbon dioxide molecule and (ii) a modified cannabinoid molecule in a gas phase comprises contacting the composition with energy at a rate of less than 100 kilowatts of power per gram of the composition for a duration of less than 60 seconds.

In some embodiments, a method comprises contacting a composition with a heated gas having a temperature of 190 to 250 degrees Celsius.

In some embodiments, a method comprises contacting a composition with a heated surface.

In some embodiments, a composition has a surface-area-to-volume ratio greater than 500 per meter. In some specific embodiments, a composition has a surface-area-to-volume ratio greater than 1000 per meter.

In some embodiments, both (a) contacting a composition with sufficient energy to convert a native cannabinoid molecule into (i) a carbon dioxide molecule and (ii) a modified cannabinoid molecule in a gas phase and (b) condensing the modified cannabinoid molecule into a condensed cannabinoid molecule are completed in less than 60 seconds.

In some embodiments, a method comprises directing a composition comprising cannabinoids along a heated path, in which the composition is contacted with sufficient energy to convert a native cannabinoid molecule into (i) a carbon dioxide molecule and (ii) a modified cannabinoid molecule in a gas phase in the heated path.

In some embodiments, a method comprises coating a heated surface with a composition comprising cannabinoids at a surface-area-to-volume ratio of the composition that is greater than 500 per meter prior to converting a native cannabinoid molecule into a carbon dioxide molecule and a modified cannabinoid molecule. In some specific embodiments, a method comprises coating a heated surface with a composition comprising cannabinoids at a surface-area-to-volume ratio of the composition that is greater than 1000 per meter prior to converting a native cannabinoid molecule into a carbon dioxide molecule and a modified cannabinoid molecule.

In some specific embodiments, a native cannabinoid molecule is cannabidiolic acid (CBDA), a modified cannabinoid molecule is cannabidiol (CBD), and a condensed cannabinoid molecule is CBD.

In some specific embodiments, a native cannabinoid molecule is tetrahydrocannabinolic acid (THCA), a modified cannabinoid molecule is tetrahydrocannabinol (THC, which is also known as delta-9-THC), and a condensed cannabinoid molecule is THC.

In some embodiments, a method comprises converting at least 75% of a native cannabinoid molecule into a condensed cannabinoid molecule per mole of the native cannabinoid molecule. In some specific embodiments, a method comprises converting at least 85% of a native cannabinoid molecule into a condensed cannabinoid molecule per mole of the native cannabinoid molecule. In some even more specific embodiments, a method comprises converting at least 90% of a native cannabinoid molecule into a condensed cannabinoid molecule per mole of the native cannabinoid molecule. In some very specific embodiments, a method comprises converting at least 95% of a native cannabinoid molecule into a condensed cannabinoid molecule per mole of the native cannabinoid molecule.

In some embodiments, a method comprises producing a liquid distillate comprising a condensed cannabinoid molecule and cannabinol (CBN) at a molar ratio greater than 100:1.

In some embodiments, a method comprises producing a product from a liquid distillate in which the product comprises a condensed cannabinoid molecule at a concentration of at least 55% by weight.

Various other aspects of the inventions of this disclosure will become apparent upon review of the following detailed description and claims. The scope of this disclosure shall not be limited by the foregoing summary and background.

The scope of each patent claim that matures from this disclosure shall not be limited by the foregoing summary and background or by the following description of the drawings and detailed description, and the scope of each patent claim that matures from this disclosure shall instead be limited by the explicit language of the claim in the context of its claim dependency.

DETAILED DESCRIPTION

The present disclosure describes methods to rapidly decarboxylate cannabinoids while limiting the generation of undesirable side products. Various methods comprise (1) rapidly vaporizing and decarboxylating a cannabinoid, and then (2) contacting the vaporized, decarboxylated cannabinoid with a heat sink to condense the decarboxylated cannabinoid.

Cannabinoids are typically decarboxylated by heating. Traditional hydrocarbon-based extraction methods typically extract cannabinoid carboxylic acids from cannabis prior to decarboxylation. The extracted cannabinoid carboxylic acids are typically then converted into activated, decarboxylated cannabinoids by heating in a vacuum oven for several hours. The inventors modelled possible reaction mechanisms and determined that cannabinoid carboxylic acids can self-catalyze the decarboxylation reaction.

Figure 1:
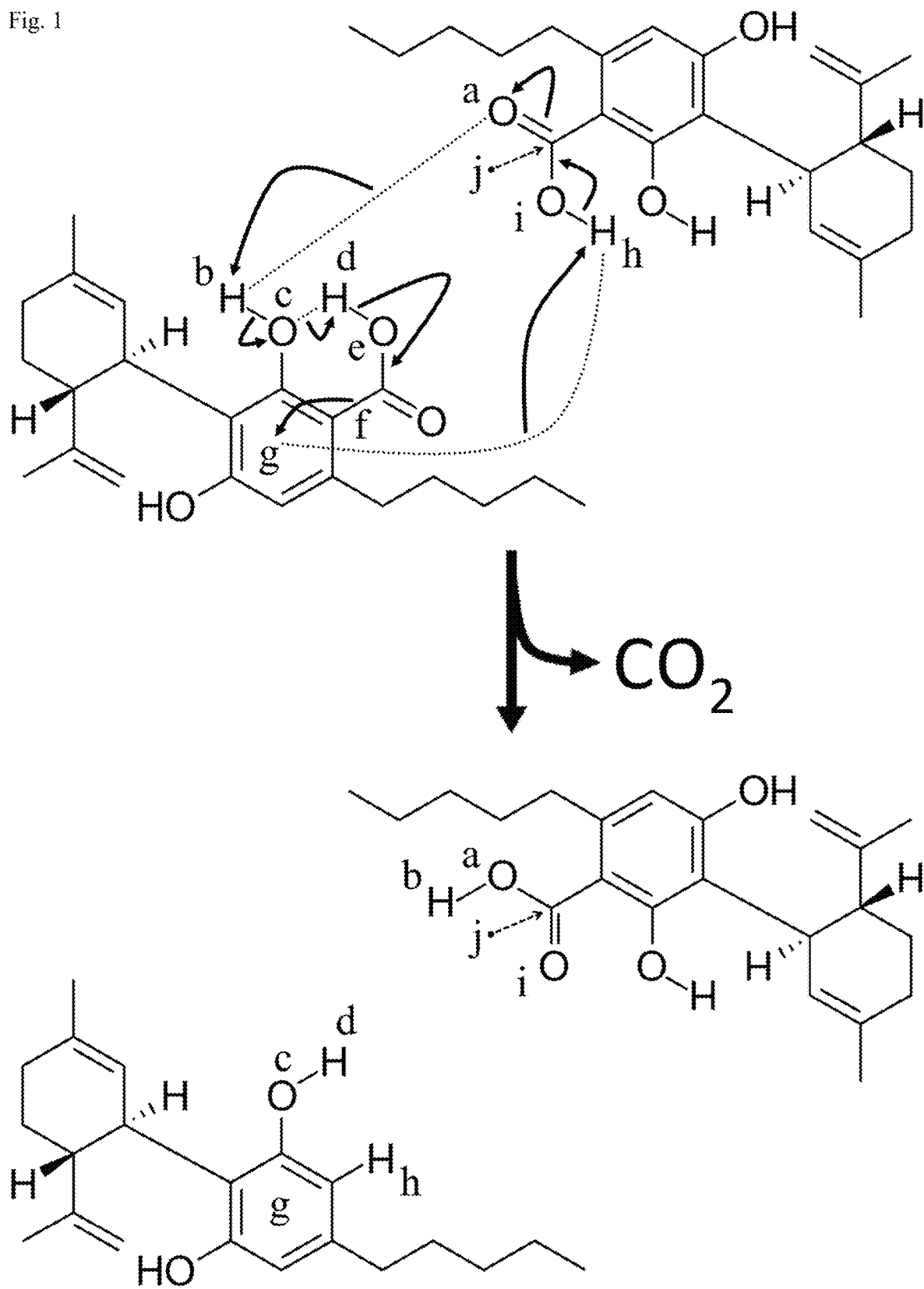
FIG. 1 depicts the skeletal formula of two CBDA molecules before and after a first CBDA molecule catalyzes the decarboxylation of a second CBDA molecule to reform the first CBDA molecule and to produce CBD and carbon dioxide from the second CBDA molecule.

Without being bound by any particular theory, it is believed that decarboxylation can proceed in a single-step, cyclic reaction depicted in FIG. 1, which shows a first 2,4-dihydroxy-3-[(1R,6R)-6-isopropenyl-3-methylcyclohex-2-en-1-yl]-6-pentylbenzoic acid (cannabidiolic acid; CBDA) molecule (FIG. 1, top) catalyzing the decarboxylation of a second CBDA molecule (FIG. 1, bottom). Immediately prior to the reaction, the first and second CBDA molecules form two intermolecular hydrogen bonds denoted by two long dotted lines in FIG. 1. The hydrogen bond depicted by the top-most dotted line is between an electron pair of the carbonyl oxygen of the first CBDA molecule (FIG. 1, "a") and the hydroxyl proton of the second CBDA molecule (FIG. 1, "b"). The hydrogen bond depicted by the bottom-most dotted is between the pi electron cloud of the second CBDA molecule (FIG. 1, "g") and the carboxylic acid proton of the first CBDA molecule (FIG. 1, "h"). An intramolecular hydrogen bond also forms between an electron pair of the hydroxyl oxygen of the second CBDA molecule (FIG. 1, "c") and the carboxylic acid proton of the second CBDA molecule (FIG. 1, "d").

The predicted, single-step, cyclic reaction shown in FIG. 1 proceeds by converting the three hydrogen bonds into covalent bonds, breaking four single bonds, converting two single bonds into double bonds, and converting a double bond into a single bond. The hydrogen bond between an electron pair of the carbonyl oxygen of the first CBDA molecule (FIG. 1, "a") and the hydroxyl proton of the second CBDA molecule (FIG. 1, "b") becomes a covalent bond, which converts the double bond between the carbonyl oxygen (FIG. 1, "a") and the carbonyl carbon (FIG. 1, "j") of the first CBDA molecule into a single bond. The hydroxyl of the second CBDA molecule reforms by converting the hydrogen bond between an electron pair of the hydroxyl oxygen of the second CBDA molecule (FIG. 1, "c") and the carboxylic acid proton of the second CBDA molecule (FIG.

1, "d") into a covalent bond. The extra electron pair of the deprotonated carboxylate oxygen of the second CBDA molecule (FIG. 1, "e") converts the single bond of the deprotonated carboxylate into a double bond, and the electron pair of the carbon-carbon single bond at the 1-position of the second CBDA molecule (FIG. 1, "f") enters the pi electron cloud of the aromatic ring of the second CBDA molecule (FIG. 1, "g") to release the deprotonated carboxylate from the second CBDA molecule as a carbon dioxide molecule. The hydrogen bond between the pi electron cloud of the second CBDA molecule (FIG. 1, "g") and the carboxylic acid proton of the first CBDA molecule (FIG. 1, "h") becomes a covalent bond to replace the deprotonated carboxylate at the 1-position of the second CBDA molecule (which left the second CBDA molecule as a carbon dioxide molecule) with the proton and form a CBD molecule. The extra electron pair of the deprotonated oxygen of the first CBDA molecule (FIG. 1, "i") converts the single bond between the deprotonated oxygen (FIG. 1, "i") and the carbonyl carbon (FIG. 1, "j") into a double bond to reform the carboxylic acid of the first CBDA molecule.

The reaction mechanism described above is represented by arrows in FIG. 1, which depict electron pair pushing. Specific atoms are annotated by the lowercase letters "a"-"e" and "h"-"j" in FIG. 1 as described above. The bond that breaks to decarboxylate the second CBDA molecule and release a carbon dioxide molecule is annotated by the lowercase letter "f" in FIG. 1 as described above. The pi electron cloud of the aromatic ring of the second CBDA molecule is annotated by the lowercase letter "g" in FIG. 1 as described above.

The proposed reaction mechanism described above was modeled in three dimensions to determine whether the sterics of the actual CBDA and THCA molecules are compatible with the proposed reaction mechanism. The inventors determined that two CBDA or THCA molecules can form near-perfect hydrogen bond lengths and geometries without steric clashes or significant entropic penalty provided that a first CBDA or THCA molecule can interact with a second CBDA or THCA molecule at an approximate orthogonal orientation.

Figure 2:
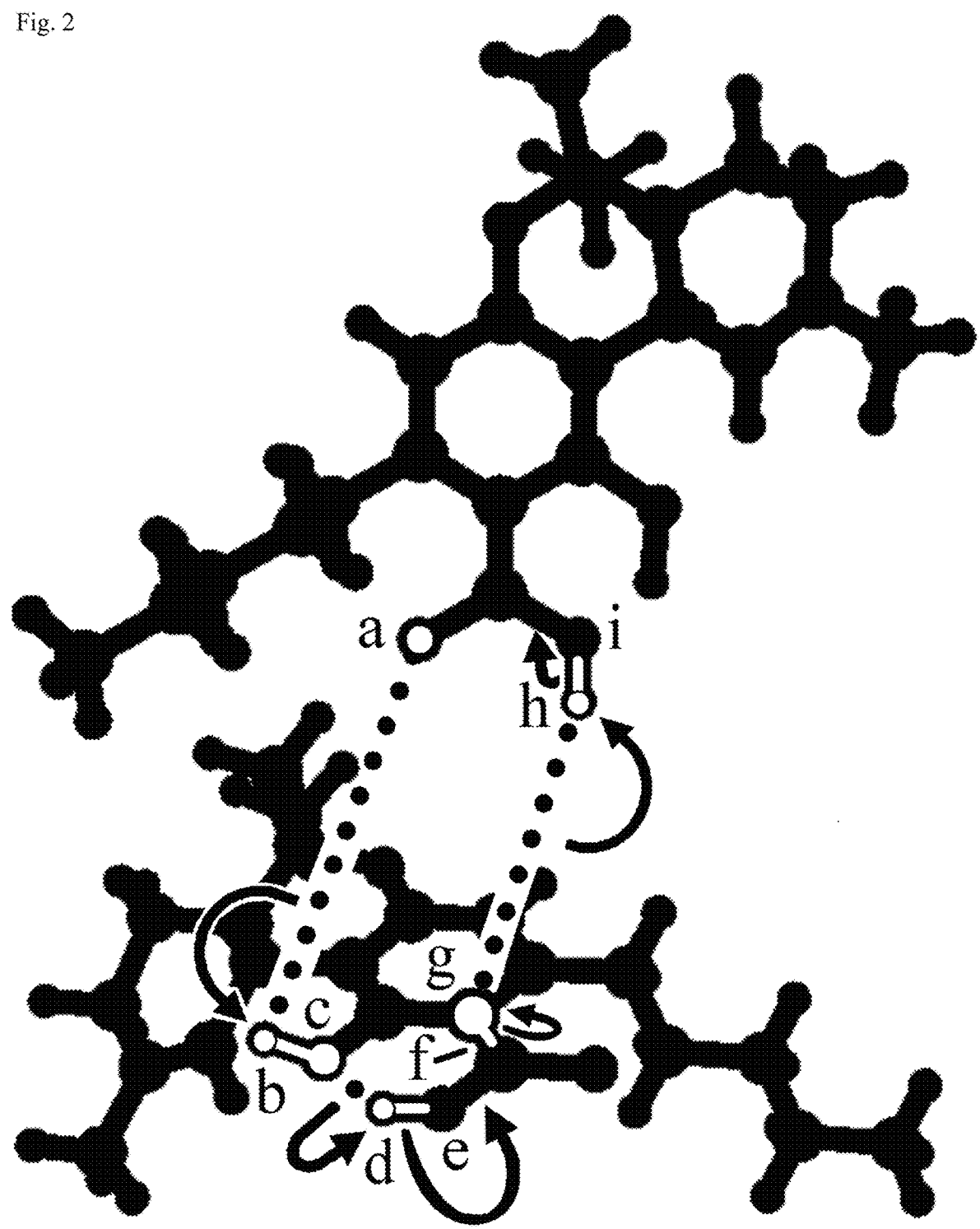
FIG. 2 is a two-dimensional rendering of ball and stick models of two THCA molecules, which depicts two intermolecular hydrogen bonds between the two THCA molecules and electron pair arrow pushing to show a predicted, single-step, cyclic chemical reaction catalyzed by a first THCA molecule that results in the decarboxylation of a second THCA molecule.

FIG. 2 shows a first (6aR,10aR)-1-hydroxy-6,6,9-trimethyl-3-pentyl-6a,7,8,10a-tetrahydro-6H-benzo[c]chromene-2-carboxylic acid (tetrahydrocannabinolic acid; THCA) molecule (FIG. 2, top) catalyzing the decarboxylation of a second THCA molecule (FIG. 2, bottom). Immediately prior to the reaction, the first and second THCA molecules form two intermolecular hydrogen bonds denoted by two long dotted lines in FIG. 2. The hydrogen bond depicted by the left-most dotted line is between an electron pair of the carbonyl oxygen of the first THCA molecule (FIG. 2, "a") and the hydroxyl proton of the second THCA molecule (FIG. 2, "b"). The hydrogen bond depicted by the right-most dotted is between the pi electron cloud of the second THCA molecule (FIG. 2, "g") and the carboxylic acid proton of the first THCA molecule (FIG. 2, "h"). An intramolecular hydrogen bond also forms between an electron pair of the hydroxyl oxygen of the second THCA molecule (FIG. 2, "c") and the carboxylic acid proton of the second THCA molecule (FIG. 2, "d").

The predicted, single-step, cyclic reaction shown in FIG. 2 proceeds by converting the three hydrogen bonds into covalent bonds, breaking four single bonds, converting two single bonds into double bonds, and converting a double bond into a single bond. The hydrogen bond between an electron pair of the carbonyl oxygen of the first THCA molecule (FIG. 2, "a") and the hydroxyl proton of the second THCA molecule (FIG. 2, "b") becomes a covalent bond, which converts the double bond between the carbonyl oxygen (FIG. 2, "a") and carbonyl carbon of the first THCA molecule into a single bond. The hydroxyl of the second THCA molecule reforms by converting the hydrogen bond between an electron pair of the hydroxyl oxygen of the second THCA molecule (FIG. 2, "c") and the carboxylic acid proton of the second THCA molecule (FIG. 2, "d") into a covalent bond. The extra electron pair of the deprotonated carboxylate oxygen of the second THCA molecule (FIG. 2, "e") converts the single bond of the deprotonated carboxylate into a double bond, and the electron pair of the carbon-carbon single bond at the 2-position of the 6H-benzo[c]chromene of the second THCA molecule (FIG. 2, "f") enters the pi electron cloud of the aromatic ring of the second THCA molecule (FIG. 2, "g") to release the deprotonated carboxylate from the second THCA molecule as a carbon dioxide molecule. The hydrogen bond between the pi electron cloud of the second THCA molecule (FIG. 2, "g") and the carboxylic acid proton of the first THCA molecule (FIG. 2, "h") becomes a covalent bond to replace the deprotonated carboxylate at the 2-position of the 6H-benzo[c]chromene of the second THCA molecule (which left the second THCA molecule as a carbon dioxide molecule) with the proton and form a THC molecule. The extra electron pair of the deprotonated oxygen of the first THCA molecule (FIG. 2, "i") converts the single bond between the deprotonated oxygen and carbonyl carbon into a double bond to reform the carboxylic acid of the first THCA molecule.

The reaction mechanism described above is represented by arrows in FIG. 2, which depict electron pair pushing. Atoms that form hydrogen bonds that become covalent bonds are shown with white fill in FIG. 2. Covalent bonds that break are shown with white fill in FIG. 2. Three hydrogen bonds that become covalent bonds are shown with dotted lines in FIG. 2. Specific atoms are annotated by the lowercase letters "a"-"e," "h", and "i" in FIG. 2 as described above. The bond that breaks to decarboxylate the second THCA molecule and release a carbon dioxide molecule is annotated by the lowercase letter "f" in FIG. 2 as described above. The pi electron cloud of the aromatic ring of the second THCA molecule is annotated by the lowercase letter "g" in FIG. 2 as described above.

The reaction mechanisms set forth above are descriptive approximations that conform with classical theories of organic chemistry. Other scientific theories such as quantum mechanical theory might describe the same chemical reaction differently and in a manner that contradicts the reaction mechanism set forth above. Regardless of the precise decarboxylation reaction mechanism, two insights obtained from the reaction mechanism are relevant: (1) a molecule having a functional group that is both a Brønsted acid and a Brønsted base (such as a carboxylic acid) can catalyze the decarboxylation of a cannabinoid, and (2) the accessible orientations between a cannabinoid and a catalyst affect the decarboxylation reaction rate.

An implication of the insights set forth above is that the activation energy of the cannabinoid decarboxylation reaction can be lowered by increasing the probability that a catalyst will contact a cannabinoid at an appropriate geometry to form two intermolecular hydrogen bonds between the catalyst and the cannabinoid. During self-catalysis in the liquid phase, cannabinoids preferentially form roughly-parallel pi-stacking interactions that inhibit the formation of intermolecular hydrogen bonds having geometries capable of the cyclic decarboxylation reaction described above. Conventional decarboxylation by heating liquid cannabinoids partially disrupts the pi-stacking interactions and introduces entropy, which each increase the probability that intermolecular hydrogen bonds will form that have an appropriate geometry and connectivity for the decarboxylation reaction. It has now been discovered that the activation energy can be lowered by introducing entropy into the system by performing the decarboxylation reaction in a gas phase.

Smoking and vaporizing marijuana are both known to decarboxylate cannabinoids, but smoking and vaporizing marijuana are not known to result in near-stoichiometric yields. Smoking degrades a substantial portion of cannabinoids by combustion, thermal oxidation, pyrolysis, and isomerization. Vaporization minimizes combustion, but vaporization nevertheless results in oxidation, pyrolysis, and isomerization.

Laboratory analyses suggest that commercially-available personal vaporizers are capable of variable decarboxylation efficiencies ranging from about 80% efficiency to near-complete decarboxylation when operated under laboratory conditions, but personal vaporizers generate substantial amounts of undesirable side products such as CBN. Consumers compensate for variable decarboxylation efficiency, oxidation, pyrolysis, and isomerization by simply titrating their dose. The laboratory analyses of consumer products that generate a vapor are informative, but these products are less relevant to commercial strategies to produce high-value liquid cannabinoids.

Attempts to decarboxylate cannabinoids by vaporization in industrial processes have met with limited success. The prior art discloses methods to decarboxylate cannabinoids from plant material by vaporization at a temperature of 145 degrees Celsius for about 30 minutes, which resulted in a purported 95% decarboxylation efficiency (U.S. Patent Application Publication No. 2016/0038437 A1). Actual yields relative to the amounts of cannabinoids in the starting materials were not reported. These methods were also incapable of recovering high yields of decarboxylated cannabinoids without converting a substantial portion of the cannabinoids into undesirable degradation products such as CBN (U.S. Patent Application Publication No. 2016/0038437 A1 at pages 10-11, paragraphs [0141]-[0147]). The recovered cannabinoids included 5.6-14.1% CBN. Formulations comprising CBN at concentrations of 1% or greater as a percentage of total cannabinoids are typically useful only as sleep aids, and concentrations of 5% or greater cause drowsiness and confusion. The purification of pharmacologically-relevant cannabinoids from CBN is challenging and limits the usefulness of methods that generate more than 1% CBN as a percentage of total cannabinoids.

The inventors previously developed systems to extract cannabinoids by vaporization (for example, PCT Patent Application Publication No. WO 2015/049585 A2 and WO 2018/102711 A1). Vaporization generally requires high temperatures, which favor both undesirable pyrolysis and decarboxylation (i.e., desirable pyrolysis). The inventors have now identified methods to decouple decarboxylation from undesirable chemical reactions during a distillation by volatilization, which are generally applicable to all known methods of distillation by vaporization. These methods are also surprisingly more efficient than prior art methods and allow simultaneous purification and decarboxylation. Other advantages are disclosed herein.

The inventors discovered that increasing energy transfer during gas phase decarboxylation surprisingly increases the rate of the decarboxylation reaction without significantly increasing the rate of undesirable oxidation, pyrolysis, and isomerization, which can (1) reduce the time of the decarboxylation reaction from hours to seconds, (2) reduce the energy required for decarboxylation, (3) increase the quality of cannabinoid products, (4) minimize post-decarboxylation clean-up and purification steps, and (5) reduce cost. This conceptual framework allows minimization of both the time and energy required to decarboxylate cannabinoids. The conceptual framework similarly allows optimization of the power required to decarboxylate cannabinoids.

The inventors identified parameters that result in marked improvements over prior art methods: (1) the cannabinoids should be present in a composition having a high surface-area-to-volume ratio, (2) the cannabinoids should be present in the composition at a relatively high concentration, and (3) cannabinoid vapor should be condensed immediately after vaporization. High surface area and high relative cannabinoid concentration ensures that the energy used to vaporize the cannabinoids favors vaporization of the cannabinoids relative to the heating and/or vaporization of other molecules. Rapid condensation of cannabinoid vapor minimizes contact between cannabinoid vapor and other heated molecules.

The inventors contemplate that reducing the duration of time that heated cannabinoids spend in contact with other heated molecules reduces the rate of undesirable oxidation, pyrolysis, and isomerization of the cannabinoids. Surprisingly, reducing the duration of time that heated cannabinoids spend in contact with other heated molecules and reducing the duration of time that cannabinoids are exposed to heat nevertheless permits rapid and efficient decarboxylation, thereby allowing near-stoichiometric decarboxylation and minimal oxidation, pyrolysis, and isomerization.

Various aspects of the disclosure relate to a method to chemically modify a cannabinoid molecule. In some embodiments, a chemical modification is a decarboxylation of a cannabinoid carboxylic acid or a cannabinoid carboxylate. In some specific embodiments, a chemical modification is the conversion of either cannabidiolic acid or cannabidiolate into cannabidiol. In some specific embodiments, a chemical modification is the conversion of either cannabidivarin carboxylic acid (CBDVA) or cannabidivarin carboxylate into cannabidivarin (CBDV). In some specific embodiments, a chemical modification is the conversion of either tetrahydrocannabinolic acid or tetrahydrocannabinolate into tetrahydrocannabinol. In some specific embodiments, a chemical modification is the conversion of either tetrahydrocannabivarin carboxylic acid (THCVA) or tetrahydrocannabivarin carboxylate into tetrahydrocannabivarin (THCV).

The term "molecule," as used in this disclosure without further context, refers to either an individual molecule or molecules of a specified type. The term "composition comprising a native cannabinoid molecule," without further context, for example, can optionally refer to either a composition comprising a single native cannabinoid molecule or a composition comprising an amount of a native cannabinoid molecule. Each instance of the term "molecule" in this disclosure can be supplemented with the word "single" or the phrase "an amount of" if allowable by context, for example, as shown in the preceding sentence.

In some embodiments, a method comprises providing a composition comprising cannabinoids, in which the cannabinoids comprise a native cannabinoid molecule, the native cannabinoid molecule comprises a carboxyl group, and the native cannabinoid molecule is in a liquid phase or a solid phase in the composition. The term "providing" includes, for example, introducing a composition into a system that performs all or part of a method described in this disclosure. The term "carboxyl group" refers to either a carboxylic acid group or a carboxylate group.

In some embodiments, a method comprises contacting a composition with sufficient energy to convert a native cannabinoid molecule of the composition into (i) a carbon dioxide molecule and (ii) a modified cannabinoid molecule in a gas phase.

In some embodiments, a method comprises contacting a modified cannabinoid molecule with a heat sink to condense the modified cannabinoid molecule into a condensed cannabinoid molecule in a distillate.

In some embodiments, a method comprises collecting a distillate. In some specific embodiments, a method comprises collecting a liquid distillate.

In some embodiments, a composition comprises a plant material. In some specific embodiments, a composition comprises a plant material, and the plant material comprises a native cannabinoid molecule. In some specific embodiments, a composition comprises a ground plant material. In some embodiments, a composition has a surface-area-to-volume ratio greater than 1000 per meter. Surface-area-to-volume ratios greater than 1000 per meter have greater rates of energy transfer than surface-area-to-volume ratios less than 1000 per meter.

In some embodiments, a plant material is a species of the genus *Cannabis*. In some specific embodiments, a plant material is *Cannabis sativa*. In some specific embodiments, a plant material is *Cannabis indica*. In some specific embodiments, a plant material is *Cannabis ruderalis*. In some very specific embodiments, a plant material is *Cannabis sativa forma indica*.

In some embodiments, a composition comprises water at a concentration of less than 10% by weight. Water can absorb a large amount of energy by evaporation, and thus, minimizing the water of a composition increases the rate of energy transfer to native cannabinoid molecules.

In some embodiments, a composition comprises an extracted oil that was extracted from a plant material of the genus *Cannabis*. In some specific embodiments, a composition comprises an extracted oil that was extracted from industrial hemp. In some specific embodiments, a composition comprises an extracted oil that was extracted from marijuana.

In some embodiments, a composition comprises a native cannabinoid molecule that was previously extracted from a plant material of the genus *Cannabis*. In some specific embodiments, a composition comprises a native cannabinoid molecule that was previously extracted from industrial hemp. In some specific embodiments, a composition comprises a native cannabinoid molecule that was previously extracted from marijuana.

In some embodiments, a composition comprises industrial hemp or a composition is derived from industrial hemp. In some embodiments, a composition comprises marijuana or a composition is derived from marijuana.

In some specific embodiments, a composition is a liquid. In some very specific embodiments, a composition is an oil.

In some embodiments, a native cannabinoid molecule is selected from one or more of THCA, THCVA, tetrahydrocannabiorcolic acid (THCOA), CBDA, CBDVA, cannabidiorcolic acid (CBDOA), cannabichromenic acid (CBCA), cannabichromevarinic acid (CBCVA), cannabigerolic acid (CBGA), cannabigerovarinic acid (CBGVA), cannabicyclolic acid (CBLA), cannabielsoic acid (CBEA), perrotetinenic acid, one or more carboxylates of any of the preceding molecules, one or more naturally-occurring ethers of any of the preceding molecules, and one or more stereoisomers of any of the preceding molecules.

In some embodiments, a modified cannabinoid molecule and a condensed cannabinoid molecule are selected from one or more of THC, THCV, tetrahydrocannabiorcol (THCO), CBD, CBDV, cannabidiorcol, (CBDO), cannabichromene (CBC), cannabichromevarin (CBCV), CBG, cannabigerovarin (CBGV), cannabicyclol (CBL), cannabielsoin (CBE), perrottetinene, one or more naturally-occurring ethers of any of the preceding molecules, and one or more stereoisomers of any of the preceding molecules.

In some specific embodiments, the native cannabinoid molecule is THCA, the modified cannabinoid molecule is THC, and the condensed cannabinoid molecule is THC.

In some specific embodiments, the native cannabinoid molecule is THCVA, the modified cannabinoid molecule is THCV, and the condensed cannabinoid molecule is THCV.

In some specific embodiments, the native cannabinoid molecule is CBDA, the modified cannabinoid molecule is CBD, and the condensed cannabinoid molecule is CBD.

In some specific embodiments, the native cannabinoid molecule is CBGA, the modified cannabinoid molecule is CBG, and the condensed cannabinoid molecule is CBG.

In some embodiments, a composition comprises a native cannabinoid molecule at a concentration of at least 3% by weight. In some specific embodiments, a composition comprises a native cannabinoid molecule at a concentration by weight of 1% to 10%, 5% to 15%, 10% to 20%, 15% to 25%, 20% to 30%, or 25% to 35%. In some specific embodiments, a composition comprises CBDA, CBDVA, THCA, THCVA, CBCA, and CBGA at a combined concentration of at least 3% by weight. In some very specific embodiments, a composition comprises CBDA, CBDVA, THCA, THCVA, CBCA, and CBGA at a combined concentration by weight of 1% to 10%, 5% to 15%, 10% to 20%, 15% to 25%, 20% to 30%, or 25% to 35%. In some very specific embodiments, a composition comprises CBDA at a concentration by weight of 1% to 10%, 5% to 15%, 10% to 20%, 15% to 25%, 20% to 30%, or 25% to 35%. In some very specific embodiments, a composition comprises THCA at a concentration by weight of 10% to 20%, 15% to 25%, 20% to 30%, or 25% to 35%. In some very specific embodiments, a composition comprises THCVA at a concentration by weight of 0.1% to 10%.

In some embodiments, a gas phase comprises one or more of molecular nitrogen, ethanol vapor, water vapor, carbon dioxide, noble gases, cannabinoids, terpenes, terpene alcohols, and terpenoids at a combined concentration of at least 90% by volume. In some specific embodiments, a gas phase comprises one or more of molecular nitrogen, ethanol vapor, water vapor, carbon dioxide, noble gases, cannabinoids, terpenes, terpene alcohols, and terpenoids at a combined concentration of at least 95% by volume. A gas phase can optionally contain a suspended liquid (such as a droplet or a plurality of droplets), a suspended solid (such as a particle or a plurality of particles), or both a suspended liquid and a suspended solid, and neither a suspended liquid nor a suspended solid is included in a percent-by-volume calculation.

In some embodiments, contacting a composition with sufficient energy to convert a native cannabinoid molecule into (i) a carbon dioxide molecule and (ii) a modified cannabinoid molecule in a gas phase comprises contacting the composition with less than 0.04 kilowatt hours of energy per gram of the composition. In some specific embodiments, contacting a composition with sufficient energy to convert a native cannabinoid molecule into (i) a carbon dioxide molecule and (ii) a modified cannabinoid molecule in a gas phase comprises contacting the composition with 0.0004 to 0.04 kilowatt hours of energy per gram of the composition. In some specific embodiments, contacting a composition with sufficient energy to convert a native cannabinoid molecule into (i) a carbon dioxide molecule and (ii) a modified cannabinoid molecule in a gas phase comprises contacting the composition with less than 0.004 kilowatt hours of energy per gram of the composition. In some very specific embodiments, contacting a composition with sufficient energy to convert a native cannabinoid molecule into (i) a carbon dioxide molecule and (ii) a modified cannabinoid molecule in a gas phase comprises contacting the composition with 0.0004 to 0.004 kilowatt hours of energy per gram of the composition.

In some embodiments, contacting a composition with sufficient energy to convert a native cannabinoid molecule into (i) a carbon dioxide molecule and (ii) a modified cannabinoid molecule in a gas phase comprises contacting the composition with energy at a rate of less than 100 kilowatts of power per gram of the composition for a duration of less than 60 seconds. In some specific embodiments, contacting a composition with sufficient energy to convert a native cannabinoid molecule into (i) a carbon dioxide molecule and (ii) a modified cannabinoid molecule in a gas phase comprises contacting the composition with 10 watts to 100 kilowatts of power per gram of the composition for 200 milliseconds to 20 seconds. In some very specific embodiments, contacting a composition with sufficient energy to convert a native cannabinoid molecule into (i) a carbon dioxide molecule and (ii) a modified cannabinoid molecule in a gas phase comprises contacting the composition with 1 to 100 kilowatts of power per gram of the composition for 200 milliseconds to 20 seconds.

In some embodiments, a method comprises irradiating a composition, convectively heating a composition, or conductively heating a composition, in which contacting a composition with sufficient energy comprises one or more of irradiating the composition, convectively heating the composition, or conductively heating the composition. Suitable methods of irradiating a composition are described, for example, in PCT Patent Application Publication No. WO 2018/102711 A1, which is incorporated by reference in its entirety. Suitable methods of convectively heating a composition are described, for example, in PCT Patent Application Publication No. WO 2015/049585 A2, which is incorporated by reference in its entirety. Suitable methods of conductively heating a composition are described, for example, in PCT Patent Application Publication No. WO 2016/161420 A1 and WO 2017/192527 A1, each of which is incorporated by reference in its entirety.

In some embodiments, a method comprises contacting a composition with a heated gas. In some specific embodiments, a method comprises contacting a composition with a heated gas having a temperature of 190 to 250 degrees Celsius. In some embodiments, a method comprises contacting a composition with a heated surface. In some specific embodiments, a method comprises contacting a composition with a heated surface having a temperature of 190 to 250 degrees Celsius.

In some embodiments, a composition is contacted with sufficient energy to convert a native cannabinoid molecule of the composition into (i) a carbon dioxide molecule and (ii) a modified cannabinoid molecule in a gas phase under vacuum. In some specific embodiments, a composition is contacted with sufficient energy to convert a native cannabinoid molecule of the composition into (i) a carbon dioxide molecule and (ii) a modified cannabinoid molecule in a gas phase at a pressure of less than 100 kilopascals. In some even more specific embodiments, a composition is contacted with sufficient energy to convert a native cannabinoid molecule of the composition into (i) a carbon dioxide molecule and (ii) a modified cannabinoid molecule in a gas phase at a pressure of 100 pascals to 100 kilopascals. In some very specific embodiments, a composition is contacted with sufficient energy to convert a native cannabinoid molecule of the composition into (i) a carbon dioxide molecule and (ii) a modified cannabinoid molecule in a gas phase at a pressure of 900 pascals to 90 kilopascals. Reducing pressure can increase entropy by partitioning molecules into the gas phase.

In some embodiments, a composition is contacted with sufficient energy to convert a native cannabinoid molecule of the composition into (i) a carbon dioxide molecule and (ii) a modified cannabinoid molecule in a gas phase at about atmospheric pressure. In some embodiments, a composition is contacted with sufficient energy to convert a native cannabinoid molecule of the composition into (i) a carbon dioxide molecule and (ii) a modified cannabinoid molecule in a gas phase at a pressure greater than atmospheric pressure.

In some embodiments, a method comprises directing a composition comprising cannabinoids along a path, in which the composition is contacted with sufficient energy to convert a native cannabinoid molecule of the composition into (i) a carbon dioxide molecule and (ii) a modified cannabinoid molecule in a gas phase while the composition is being directed along the path. In some specific embodiments, a path is a heated path.

In some embodiments, a path comprises one or more surfaces, and a method comprises heating the one or more surfaces to a temperature of 190 to 250 degrees Celsius.

In some embodiments, a composition comprises a non-volatile molecule, and a method comprises separating a modified cannabinoid molecule in a gas phase from the non-volatile molecule. In some specific embodiments, separating a modified cannabinoid molecule in a gas phase from a non-volatile molecule is performed after converting a native cannabinoid molecule into (i) a carbon dioxide molecule and (ii) the modified cannabinoid molecule in the gas phase. In some specific embodiments, separating a modified cannabinoid molecule in a gas phase from a non-volatile molecule is performed prior to contacting the modified cannabinoid molecule with a heat sink. In some specific embodiments, a method comprises collecting a non-volatile molecule. Non-volatile molecules optionally include one or more of chlorophyll, cellulose, nucleic acids, proteins, carbohydrates, sugars, triglycerides, phospholipids, fatty acids, salts, ions, ash, glass, sand, rock, metal, and polymers.

In some embodiments, a method converts less than 2% of a native cannabinoid molecule of a composition into CBN by mole.

In some embodiments, a method comprises producing a distillate comprising a condensed cannabinoid molecule and CBN at a molar ratio greater than 100:1.

In some embodiments, a composition comprises one or both of CBDA and CBD, and a method converts less than 2% of the CBDA and CBD of the composition into CBN by mole.

In some embodiments, a method comprises producing a distillate comprising CBD and CBN at a molar ratio greater than 100:1.

In some embodiments, a composition comprises one or both of THCA and THC, and a method converts less than 2% of the THCA and THC of the composition into CBN by mole.

In some embodiments, a method comprises producing a distillate comprising THC and CBN at a molar ratio greater than 100:1.

In some embodiments, a method converts less than 0.2% of a native cannabinoid molecule of a composition into delta-8-tetrahydrocannabinol (delta-8-THC) by mole.

In some embodiments, a method comprises producing a distillate comprising a condensed cannabinoid molecule and delta-8-THC at a molar ratio greater than 300:1.

In some embodiments, a composition comprises one or both of CBDA and CBD, and a method converts less than 0.2% of the CBDA and CBD of the composition into delta-8-THC by mole.

In some embodiments, a method comprises producing a distillate comprising CBD and delta-8-THC at a molar ratio greater than 300:1.

In some embodiments, a composition comprises one of both of THCA and THC, and a method converts less than 0.2% of the THCA and THC of the composition into delta-8-THC by mole.

In some embodiments, a method comprises producing a distillate comprising THC and delta-8-THC at a molar ratio greater than 300:1.

In some embodiments, a method converts less than 2% of a native cannabinoid molecule of a composition into CBN by mole. In some specific embodiments, a composition comprises a native cannabinoid molecule, the native cannabinoid molecule is CBDA, and a method converts less than 2% of the CBDA into CBN by mole. In some specific embodiments, a composition comprises a native cannabinoid molecule, the native cannabinoid molecule is THCA, and a method converts less than 2% of the THCA into CBN by mole.

In some embodiments, a method converts less than 0.2% of a native cannabinoid molecule into delta-8-THC by mole. In some specific embodiments, a composition comprises a native cannabinoid molecule, the native cannabinoid molecule is CBDA, and a method converts less than 0.2% of the CBDA into delta-8-THC by mole. In some specific embodiments, a composition comprises a native cannabinoid molecule, the native cannabinoid molecule is THCA, and a method converts less than 0.2% of the THCA into delta-8-THC by mole.

In some embodiments, a heat sink comprises a volatile liquid. Heat sinks comprising a volatile liquid are particularly useful because the vaporization of a volatile liquid can absorb a large amount of energy. In some specific embodiments, a heat sink comprises a volatile liquid, and the volatile liquid comprises one or both of ethanol and water. In some very specific embodiments, a heat sink comprises a volatile liquid, and the volatile liquid comprises ethanol and water at a combined concentration by weight of at least 90%.

In some embodiments, contacting a modified cannabinoid molecule with a heat sink comprises directing the modified cannabinoid molecule through a fluid-cooled condenser. Examples of fluid-cooled condensers include Liebig condensers, West condensers, Allihn condensers, Davies condensers, Graham condensers, Friedrichs condensers, spiral condensers, coil condensers, and Dimroth condensers. A condenser may be cooled, for example, with water. In some embodiments, the method comprises providing a distillation apparatus with an integrated condenser.

In some embodiments, a method comprises contacting a modified cannabinoid molecule with a heat sink less than 360 seconds after contacting a composition with sufficient energy to convert a native cannabinoid molecule into (i) a carbon dioxide molecule and (ii) the modified cannabinoid molecule. In some specific embodiments, a method comprises contacting a modified cannabinoid molecule with a heat sink less than 240 seconds after contacting a composition with sufficient energy to convert a native cannabinoid molecule into (i) a carbon dioxide molecule and (ii) the modified cannabinoid molecule.

In some embodiments, a method comprises condensing a modified cannabinoid molecule into a condensed cannabinoid molecule less than 360 seconds after contacting a composition with sufficient energy to convert a native cannabinoid molecule into (i) a carbon dioxide molecule and (ii) the modified cannabinoid molecule. In some specific embodiments, a method comprises condensing a modified cannabinoid molecule into a condensed cannabinoid molecule less than 240 seconds after contacting a composition with sufficient energy to convert a native cannabinoid molecule into (i) a carbon dioxide molecule and (ii) the modified cannabinoid molecule.

In some specific embodiments, a method comprises producing a distillate comprising CBN at a concentration less than 0.8% by weight. In some specific embodiments, a method comprises producing a distillate comprising one or both of CBD and THC at a combined concentration greater than 6% by weight and CBN at a concentration less than 0.8% by weight.

In some embodiments, a method comprises producing a distillate comprising condensed cannabinoids, in which less than 2% of the condensed cannabinoids of the distillate comprise a carboxyl group.

In some embodiments, a method comprises converting at least 75% of a native cannabinoid molecule of a composition into a condensed cannabinoid molecule in a distillate by mole.

In some embodiments, a method comprises producing a distillate comprising condensed cannabinoid molecules selected from one, two, three, four, five, or each of CBD, CBDV, THC, THCV, CBC, and CBG. In some specific embodiments, a method comprises producing a distillate comprising condensed cannabinoid molecules in which at least 95% of the condensed cannabinoid molecules of the distillate are CBD, CBDV, THC, THCV, CBC, and CBG by weight.

In some embodiments, a method comprises producing a distillate comprising ethanol. In some specific embodiments, a method comprises producing a distillate comprising ethanol at a concentration of at least 50% by weight, in which a condensed cannabinoid molecule is dissolved in the ethanol. Ethanol reduces the viscosity of a distillate, which improves the flow of a distillate in automated systems at lower temperatures.

In some embodiments, a distillate comprises a non-cannabinoid molecule and a condensed cannabinoid molecule, and a method comprises separating the non-cannabinoid molecule from the condensed cannabinoid molecule to produce a product. In some specific embodiments, a distillate comprises a non-cannabinoid molecule and a condensed cannabinoid molecule, and a method comprises separating the non-cannabinoid molecule from the condensed cannabinoid molecule to produce a product comprising the condensed cannabinoid molecule at a concentration of at least 55% by weight. In some very specific embodiments, a distillate comprises a non-cannabinoid molecule and a condensed cannabinoid molecule, and a method comprises separating the non-cannabinoid molecule from the condensed cannabinoid molecule to produce a product comprising the condensed cannabinoid molecule at a concentration of 55% to 80% by weight. In some very specific embodiments, a distillate comprises a non-cannabinoid molecule and a condensed cannabinoid molecule, and a method comprises separating the non-cannabinoid molecule from the condensed cannabinoid molecule to produce a product comprising the condensed cannabinoid molecule at a concentration of 75% to 99.9% by weight.

In some embodiments, a non-cannabinoid molecule is ethanol. In some embodiments, a non-cannabinoid molecule is a terpene, terpene alcohol, or terpenoid.

In some embodiments, a distillate comprises a non-cannabinoid molecule and CBD, and a method comprises separating the non-cannabinoid molecule from the CBD to produce a product comprising the CBD at a concentration of at least 55% by weight. In some specific embodiments, a distillate comprises a non-cannabinoid molecule and CBD, and a method comprises separating the non-cannabinoid molecule from the CBD to produce a product comprising the CBD at a concentration of 55% to 80% by weight. In some very specific embodiments, a distillate comprises a non-cannabinoid molecule and CBD, and a method comprises separating the non-cannabinoid molecule from the CBD to produce a product comprising the CBD at a concentration of 75% to 99.9% by weight.

In some embodiments, a distillate comprises a non-cannabinoid molecule and THC, and a method comprises separating the non-cannabinoid molecule from the THC to produce a product comprising the THC at a concentration of at least 55% by weight. In some specific embodiments, a distillate comprises a non-cannabinoid molecule and THC, and a method comprises separating the non-cannabinoid molecule from the THC to produce a product comprising the THC at a concentration of 55% to 80% by weight. In some very specific embodiments, a distillate comprises a non-cannabinoid molecule and THC, and a method comprises separating the non-cannabinoid molecule from the THC to produce a product comprising the THC at a concentration of 75% to 99.9% by weight.

In some embodiments, a product is a liquid comprising a condensed cannabinoid molecule and at least one solute, in which the condensed cannabinoid molecule is a solvent, and the at least one solute is dissolved in the solvent. In some specific embodiments, a product is a liquid comprising CBD and THC; the CBD is a solvent; the THC is a solute; and the THC is dissolved in the CBD. In some specific embodiments, a product is a liquid comprising THC and CBD; the THC is a solvent; the CBD is a solute; and the CBD is dissolved in the THC.

In some embodiments, the liquid distillate is the product.

In some embodiments, the method comprises combining the liquid distillate with one or more terpenes to produce a product. The terpenes may comprise, for example, one or more of beta-caryophyllene, humulene, guaiol, alpha-bisabolol, linalool, alpha-terpinene, myrcene, eucalyptol, limonene, nerolidol, alpha-terpinene, and borneol.

Figure 3:
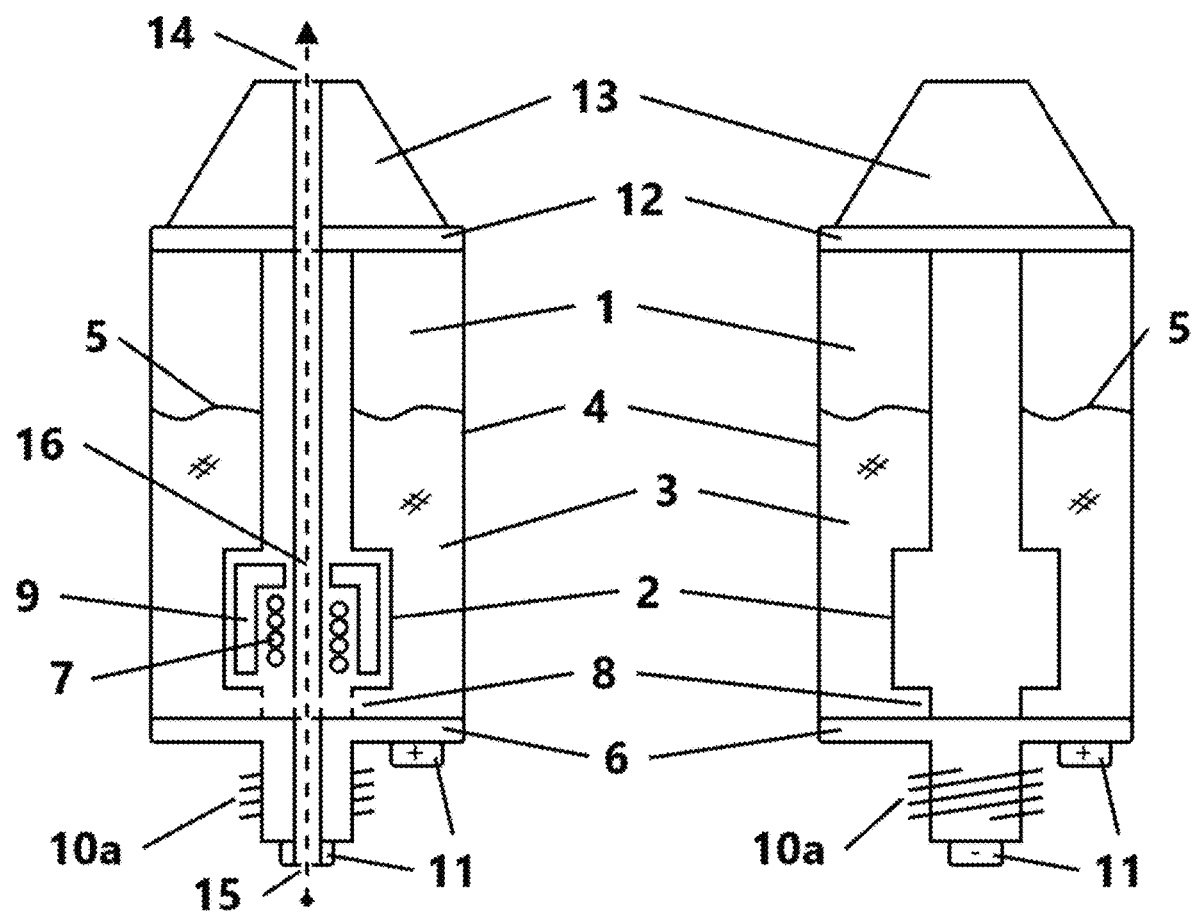
FIG. 3 depicts two cartoons of a vaporizer cartridge comprising a chamber 1, a heating element 2, and distillate 3 within the chamber 1, wherein the distillate 3 is in thermal communication with the heating element 2. The cartoon on the left depicts a cross-section of the vaporizer cartridge, and the cartoon on the right depicts a side view of the vaporizer cartridge. The vaporizer cartridge has a threaded connector 10a to facilitate the connection of the heating element 2 to a battery.

FIG. 3 depicts two cartoons of a vaporizer cartridge comprising a chamber 1, a heating element 2, and distillate 3 within the chamber 1, wherein the distillate 3 is in thermal communication with the heating element 2. The cartoon on the left depicts a cross-section of the vaporizer cartridge, and the cartoon on the right depicts a side view of the vaporizer cartridge. The vaporizer cartridge comprises one or more walls 4, which are at least partially transparent to allow visualization of a fill line 5 of the distillate 3 within the chamber 1. A lower portion 6 of the vaporizer cartridge seals the lower end of the chamber 1. The heating element 2 extends into the chamber 1 to allow thermal communication between the heating element 2 and the distillate 3 within the chamber 1. The heating element 2 is attached onto the lower portion 6 of the vaporizer cartridge. The heating element 2 comprises a heating coil 7 that converts electricity to heat. The heating element 2 comprises cavities 8 that allow thermal communication between the heating element 2 and an amount of distillate 3 to be vaporized. The cavities 8 are positioned adjacent to the lower portion 6 of the vaporizer cartridge, which facilitates the gravity flow of distillate 3 within the chamber 1 toward them. The heating element 2 also comprises a thermal barrier 9 that inhibits the thermal degradation of distillate 3 within the chamber 1. The lower portion 6 of the vaporizer cartridge also comprises a threaded connector 10a to create and maintain electrical communication between the heating element 2 and a battery by creating and maintaining physical contact between conductive interfaces 11 of the vaporizer cartridge and conductive interfaces of a housing that houses the battery. The vaporizer cartridge comprises an upper portion 12 that seals an upper end of the chamber 1. The upper portion 12 of the vaporizer cartridge comprises a mouthpiece 13 that has an opening 14. The positioning of the mouthpiece 13 on the upper portion 12 of the vaporizer cartridge inhibits the gravity flow of distillate 3 toward the mouthpiece 13, which might otherwise obstruct the opening 14. The vaporizer cartridge comprises an air inlet 15 distal from the mouthpiece 13 and in fluid communication with the mouthpiece 13 to allow airflow from the air inlet 15, through the vaporizer cartridge, and to the opening 14 of the mouthpiece 13. The heating element 2 comprises a lumen 16 in fluid communication with both the air inlet 15 and the opening 14 of the mouthpiece 13 such that vacuum applied to the mouthpiece 13 draws air through the lumen 16 from the air inlet 15. The dashed line depicts the flow of gases through the air inlet 15, lumen 16 of the heating element 2, and opening 14 of the mouthpiece 13. The lumen 16 is in fluid communication with distillate 3 within the chamber 1 through cavities 8 of the heating element 2 such that cannabinoid vapor may enter the lumen 16 through the cavities, mix with air within the lumen 16, and exit the opening 14 of the mouthpiece 13.

Figure 4:
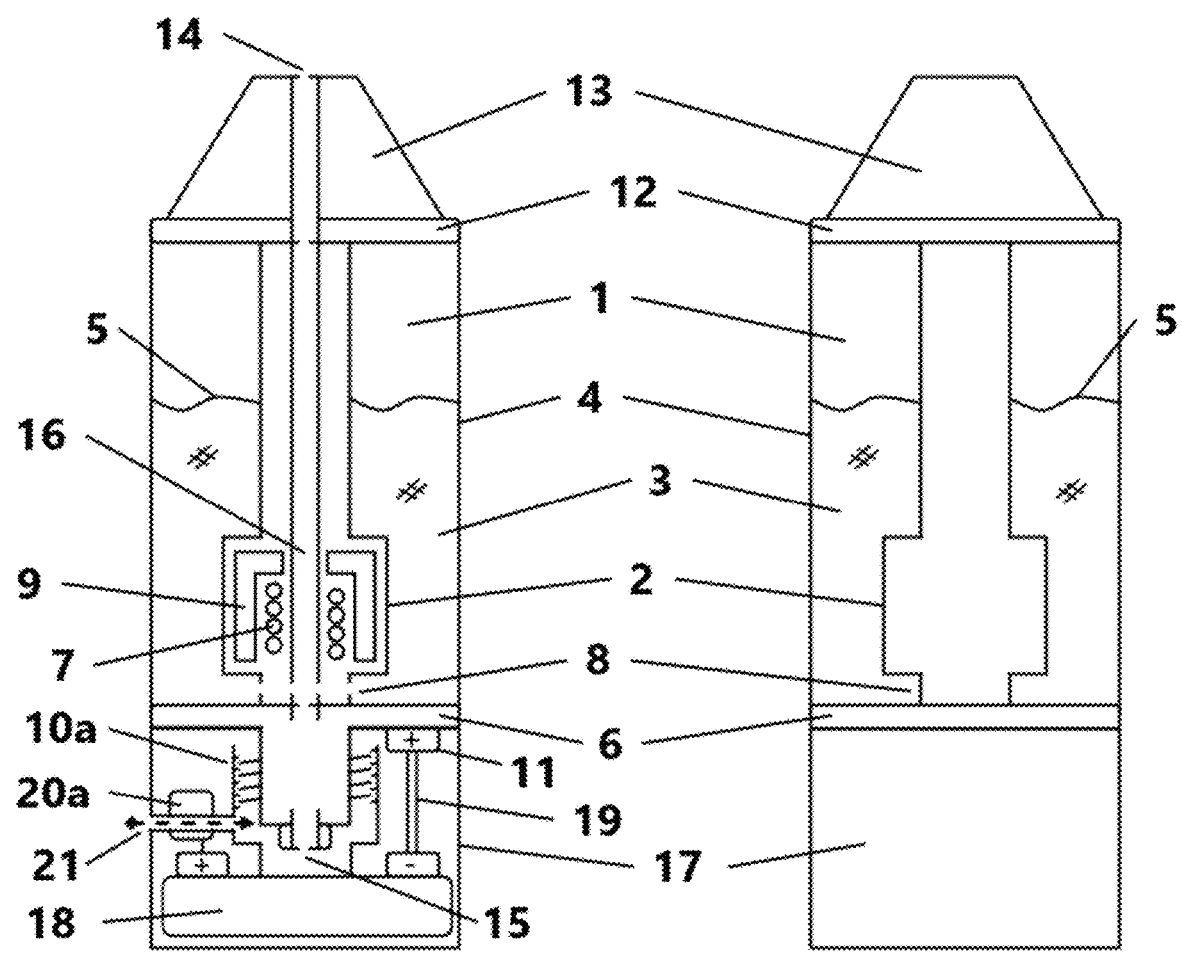
FIG. 4 depicts two cartoons of the vaporizer cartridge of FIG. 3, in which the threaded connector 10a connects the vaporizer cartridge to a housing 17 that houses a battery 18. The housing 18 also houses an airflow sensor 20a that completes a circuit (not shown) between the battery 18 and the heating element 2 when air flows through the airflow sensor 20a. The cartoon on the left depicts a cross section of the vaporizer cartridge and the housing 17, and the cartoon on the right depicts a side view of the vaporizer cartridge and the housing 17.

FIG. 4 comprises two cartoons of the vaporizer cartridge of FIG. 3, in which the threaded connector 10a connects the vaporizer cartridge to a housing 17 that houses a battery 18. The cartoon on the left depicts a cross section of the vaporizer cartridge and the housing 17, and the cartoon on the right depicts a side view of the vaporizer cartridge and the housing 17. The housing 17 houses a conductive interface 19 that allows electrical communication between the battery 18 and the heating element 2. The vaporizer cartridge and housing 17 may be configured, for example, such that the threaded interface 10a of the lower portion 6 of the vaporizer cartridge either has a stop position that aligns a conductive interface 11 of the vaporizer cartridge with a conductive interface 19 within the housing 17, or one or both of a conductive interface 11 of the vaporizer cartridge and a conductive interface 19 within the housing 17 may be circular and concentric with the threaded interface 10a such that tightening the threaded interface 10a creates contact between a conductive interface 11 of the vaporizer cartridge and a conductive interface 19 within the housing independent of alignment about the concentric axis. One or more conductive interfaces 11, 19 may optionally be mounted within the housing 17 with a compression spring to ensure contact between one or more conductive interfaces 11, 19. The housing 17 houses an airflow sensor 20a that completes a circuit (not shown) between the battery 18 and the heating element 2 when air flows through the airflow sensor 20a. The airflow sensor 20a may comprise, for example, a mechanical switch that physically closes a circuit when air flows through the airflow sensor 20a and a compression or tension spring that physically opens the circuit in the absence of airflow. Such a mechanical switch can reversibly seal the housing, and another mechanical switch or flap can reversibly seal, for example, the upper portion 12 of the vaporizer cartridge to inhibit airflow through the vaporizer cartridge when not in use and thereby inhibit oxidation of distillate 3 within the chamber 1. Non-limiting examples of alternate airflow sensors include diaphragm sensors, in which airflow creates air pressure that causes a diaphragm to press against an actuator and close a circuit. The housing 17 also comprises a vent 21 that allows external air to flow through the airflow sensor 20a, through the air inlet 15 of the lower portion 6 of the vaporizer cartridge, through the lumen 16 of the heating element 2, and out through the opening 14 of the mouthpiece 13 of the upper portion 12 of the vaporizer cartridge when vacuum is applied to the mouthpiece 13. A dashed line depicts the flow of air from the vent 21 through the airflow sensor 20a into a void within the housing 17, from which void the air may enter the air inlet 15 of the lower portion 6 of the vaporizer cartridge.

Figure 5:
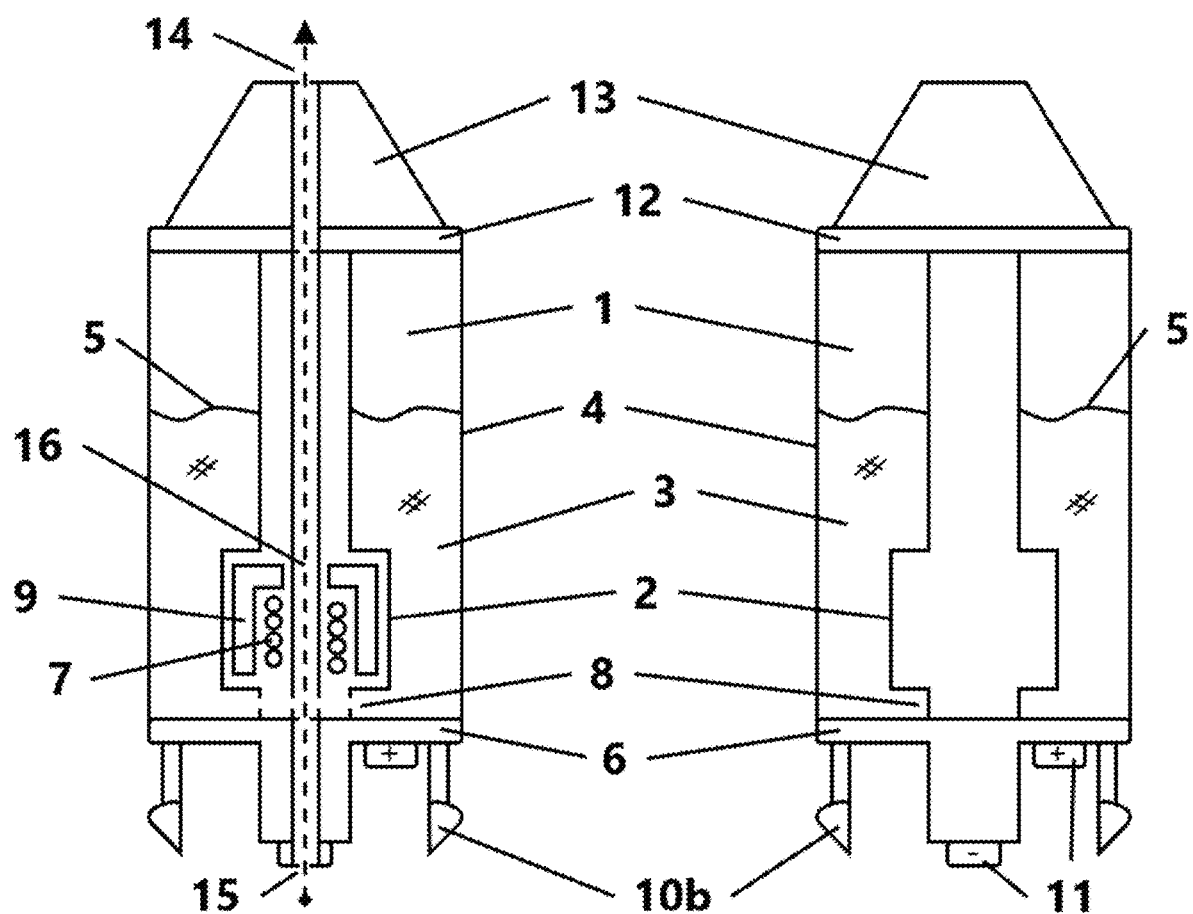
FIG. 5 depicts two cartoons of a vaporizer cartridge comprising a chamber 1, a heating element 2, and distillate 3 within the chamber 1, wherein the distillate 3 is in thermal communication with the heating element 2. The cartoon on the left depicts a cross-section of the vaporizer cartridge, and the cartoon on the right depicts a side view of the vaporizer cartridge. The vaporizer cartridge comprises a snap-fit connector 10b to facilitate the connection of the heating element 2 to a battery.

FIG. 5 depicts two cartoons of a vaporizer cartridge comprising a chamber 1, a heating element 2, and distillate 3 within the chamber 1, wherein the distillate 3 is in thermal communication with the heating element 2. The cartoon on the left depicts a cross-section of the vaporizer cartridge, and the cartoon on the right depicts a side view of the vaporizer cartridge. The vaporizer cartridge comprises one or more walls 4, which are at least partially transparent to allow visualization of a fill line 5 of the distillate 3 within the chamber 1. A lower portion 6 of the vaporizer cartridge seals the lower end of the chamber 1. The heating element 2 extends into the chamber 1 to allow thermal communication between the heating element 2 and the distillate 3 within the chamber 1. The heating element 2 is attached onto the lower portion 6 of the vaporizer cartridge. The heating element 2 comprises a heating coil 7 that converts electricity to heat. The heating element 2 comprises cavities 8 that allow thermal communication between the heating element 2 and an amount of distillate 3 to be vaporized. The cavities 8 are positioned adjacent to the lower portion 6 of the vaporizer cartridge, which facilitates the gravity flow of distillate 3 within the chamber 1 toward them. The heating element 2 also comprises a thermal barrier 9 that inhibits the thermal degradation of distillate 3 within the chamber 1. The lower portion 6 of the vaporizer cartridge also comprises a snap-fit connector 10b to create and maintain electrical communication between the heating element 2 and a battery by creating and maintaining physical contact between conductive interfaces 11 of the vaporizer cartridge and conductive interfaces of a housing that houses the battery. The vaporizer cartridge comprises an upper portion 12 that seals an upper end of the chamber 1. The upper portion 12 of the vaporizer cartridge comprises a mouthpiece 13 that has an opening 14. The positioning of the mouthpiece 13 on the upper portion 12 of the vaporizer cartridge inhibits the gravity flow of distillate 3 toward the mouthpiece 13, which might otherwise obstruct the opening 14. The vaporizer cartridge comprises an air inlet 15 distal from the mouthpiece 13 and in fluid communication with the mouthpiece 13 to allow airflow from the air inlet 15, through the vaporizer cartridge, and to the opening 14 of the mouthpiece 13. The heating element 2 comprises a lumen 16 in fluid communication with both the air inlet 15 and the opening 14 of the mouthpiece 13 such that vacuum applied to the mouthpiece 13 draws air through the lumen 16 from the air inlet 15. The dashed line depicts the flow of gases through the air inlet 15, lumen 16 of the heating element 2, and opening 14 of the mouthpiece 13. The lumen 16 is in fluid communication with distillate 3 within the chamber 1 through cavities 8 of the heating element 2 such that cannabinoid vapor may enter the lumen 16 through the cavities, mix with air within the lumen 16, and exit the opening 14 of the mouthpiece 13.

Figure 6:
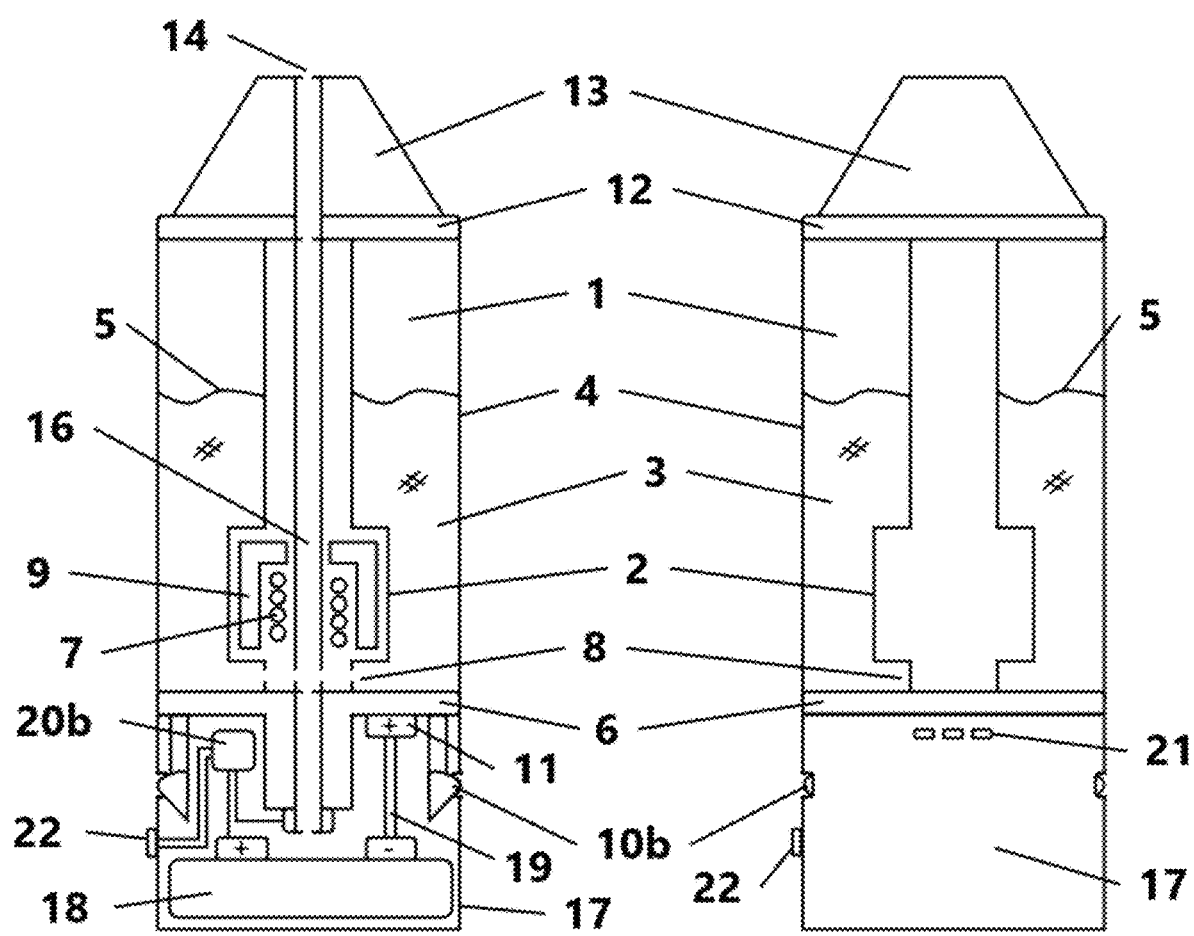
FIG. 6 depicts two cartoons of the vaporizer cartridge of FIG. 5, in which the snap-fit connector 10b connects the vaporizer cartridge to a housing 17 that houses a battery 18. The housing 17 also houses a controller 20b and an actuator 22, which complete a circuit between the battery 18 and the heating element 2 when the actuator 22 is pressed. The cartoon on the left depicts a cross section of the vaporizer cartridge and the housing 17, and the cartoon on the right depicts a side view of the vaporizer cartridge and the housing 17.

FIG. 6 comprises two cartoons of the vaporizer cartridge of FIG. 5, in which the snap-fit connector 10b connects the vaporizer cartridge to a housing 17 that houses a battery 18. The cartoon on the left depicts a cross section of the vaporizer cartridge and the housing 17, and the cartoon on the right depicts a side view of the vaporizer cartridge and the housing 17. The housing 17 houses a conductive interface 19 that allows electrical communication between the battery 18 and the heating element 2 when the snap-fit connector 10b connects the housing 17 to the vaporizer cartridge to create physical contact between the conductive interface 11 of the lower portion 6 of the vaporizer cartridge and the conductive interface 19 within the housing. The housing 17 houses a controller 20b that completes a circuit between the battery 18 and the heating element 2 when an actuator 22 on the outer surface of the housing 17 is pressed. The housing 17 also comprises vents 21 that allow external air to flow through the air inlet 15 of the lower portion 6 of the vaporizer cartridge, through the lumen 16 of the heating element 2, and out through the opening 14 of the mouthpiece 13 of the upper portion 12 of the vaporizer cartridge when vacuum is applied to the mouthpiece 13.

Various combinations of the features disclosed herein will be evident to those of ordinary skill, and these combinations are expressly contemplated by the inventors. This disclosure discloses each linguistic and grammatical combination of different features disclosed anywhere in the disclosure as though any specific combination were disclosed in the same sentence. The language and grammar of this disclosure is intentionally selected to explicitly clarify the combinations contemplated by the inventors.

The words "comprising," "comprises," and "comprise" refer to open-ended sets. For example, a composition comprising water can also comprise ethanol.

The phrases "consisting of," "consists of," and "consist of" refer to closed sets. For example, a composition consisting of water cannot also comprise ethanol.

The phrases "some embodiments," "some specific embodiments, "some even more specific embodiments," and "some very specific embodiments" differentiate more generic embodiments from more specific embodiments, and no other meaning shall be ascribed to the four foregoing phrases.

The following examples provide a framework to implement certain aspects of the disclosure, and these examples do not limit the scope of this disclosure or any claim that matures from this disclosure.

EXEMPLIFICATION

Figure 7:
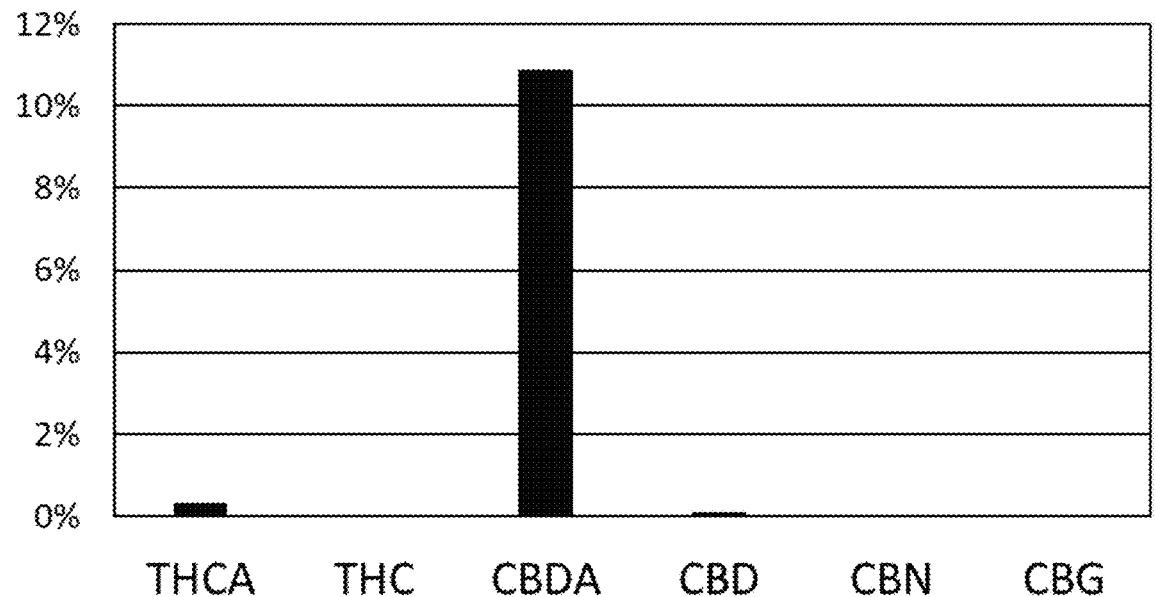
FIG. 7 is a bar graph depicting the THCA, THC, CBDA, CBD, CBN, and cannabigerol (CBG) concentrations found in a typical sample of USDA organic industrial hemp.

Example 1. Simultaneous Decarboxylation and Distillation of Cannabinoids from Organic Hemp The method of PCT Patent Application Publication No. WO 2016/161420 A1 is performed using organic industrial hemp and the parameters described in this example. The water content of the hemp is less than 10% by weight. The cannabinoid content of the hemp is about 11-12% by weight and consists of about 11% CBDA, 0.1% CBD, 0.3% THCA, and 0% THC by weight (see, for example, FIG. 7). The hemp is ground and sifted to provide a particulate having a surface-area-to-volume ratio greater than 5000 per meter. The hemp is suspended in heated gas to vaporize the cannabinoids. The heated gas is produced by resistive heating at 10-20 kilowatts. The oxygen content of the heated gas is significantly below the ~20% oxygen content of air by volume. Oxygen is reduced relative to air by evaporating water from the hemp. The heated gas and suspended hemp are directed along a heated path. A known mass of hemp is directed along the heated path at a known rate such that the hemp is exposed to less than 0.04 kilowatt hours of energy per gram of the hemp. Cannabinoid vapor is mechanically separated from suspended non-volatile molecules of the hemp including cellulose and chlorophyll using a cyclone and filters. Cannabinoid vapor is condensed by a heat sink less than 10 seconds after vaporization. A liquid distillate is collected by rinsing the condensed cannabinoids from surfaces of the heat sink with ethanol. Greater than 90% of the cannabinoids of the hemp are recovered as cannabinoids of the liquid distillate by mole. Greater than 95% of the cannabinoids of the liquid distillate are decarboxylated. A rotary evaporator is used to remove ethanol and water from the liquid distillate to produce a uniform product comprising at least 10% by weight cannabinoids.

Figure 8:
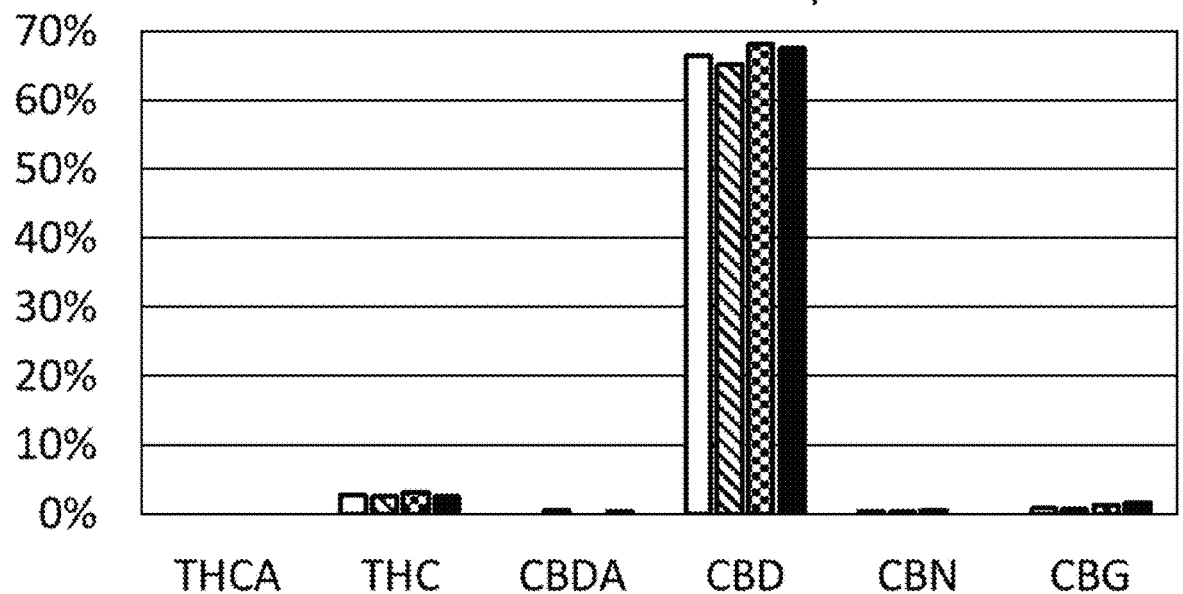
FIG. 8 is a bar graph depicting the THCA, THC, CBDA, CBD, CBN, and CBG concentrations found in four different concentrate products produced according to methods of this disclosure.

Example 2. Products Produced by the Simultaneous Decarboxylation and Distillation of Cannabinoids The method of Example 1 was performed on four different batches of organic hemp, and cannabinoid concentrations of concentrated products produced from the liquid distillates were determined by an accredited, third-party cannabis testing laboratory. Actual cannabinoid concentrations by weight of concentrated products produced from liquid distillates are shown in FIG. 8 and in Table 1. In each instance, greater than 99% of the cannabinoids of the concentrated products were decarboxylated.

TABLE 1

Actual Concentrations of Cannabinoids in Four Concentrated Products Produced by Simultaneous Decarboxylation and Distillation of Cannabinoids from Organic Industrial Hemp

|      | 1     | 2     | 3     | 4     |
|------|-------|-------|-------|-------|
| CBD  | 66.5% | 65.2% | 68.1% | 67.6% |
| CBDA | 0.0%  | 0.6%  | 0.0%  | 0.3%  |
| THC  | 2.7%  | 2.6%  | 3.2%  | 2.6%  |
| THCA | 0.0%  | 0.0%  | 0.0%  | 0.0%  |
| CBN  | 0.4%  | 0.3%  | 0.4%  | 0.0%  |
| CBG  | 0.96% | 0.76% | 1.27% | 1.62% |

Example 3. Simultaneous Decarboxylation and Distillation of Cannabinoids from Cannabis The method of PCT Patent Application Publication No. WO 2016/161420 A1 is performed using organic cannabis and the parameters described in this example. The water content of the cannabis is less than 10% by weight. The cannabinoid content of the cannabis is about 20-30% by weight. The cannabis is ground and sifted to provide a particulate having a surface-area-to-volume ratio greater than 5000 per meter. The cannabis is suspended in heated gas to vaporize the cannabinoids. The heated gas is produced by resistive heating at 10-20 kilowatts. The oxygen content of the heated gas is significantly below the ~20% oxygen content of air by volume. Oxygen is reduced relative to air by evaporating water from the cannabis. The heated gas and suspended cannabis are directed along a heated path. A known mass of cannabis is directed along the heated path at a known rate such that the cannabis is exposed to less than 0.04 kilowatt hours of energy per gram of the cannabis. Cannabinoid vapor is mechanically separated from suspended non-volatile molecules of the cannabis including cellulose and chlorophyll using a cyclone and filters. Cannabinoid vapor is condensed by a heat sink less than 10 seconds after vaporization. A liquid distillate is collected by rinsing the condensed cannabinoids from surfaces of the heat sink with ethanol. Greater than 90% of the cannabinoids of the cannabis are recovered as cannabinoids of the liquid distillate by mole. Greater than 95% of the cannabinoids of the liquid distillate are decarboxylated. A rotary evaporator is used to remove ethanol and water from the liquid distillate to produce a uniform product comprising at least 10% by weight cannabinoids.

Example 4. Products Produced from the Simultaneous Decarboxylation and Distillation of Cannabinoids from USDA Organic Hemp at Commercial Scale The methods described in Example 1 were performed on 25 tons of USDA organic industrial hemp to produce USDA organic certified hemp extracts that are sold online and in natural product grocers throughout the United States. Third party ISO/IEC 17025 accredited cannabinoid testing laboratories were engaged to measure cannabinoid concentrations in the raw plant material, extracted plant material, and extract to support regulatory compliance, quality control, and valuation of the input and outputs. Measurements obtained on two different lots of the 25-ton production run are set forth in Tables 2 and 3. These measurements are disclosed for exemplary purposes, and they do not limit the scope of the disclosure or any claim that matures from this disclosure.

TABLE 2

Simultaneous Distillation and Decarboxylation of Cannabinoids from USDA Organic Industrial Hemp in a 2-Second Process with Measurements Performed by Third Party ISO/IEC 17025 Accredited Cannabinoid-Testing Laboratories

|  | Raw Plant Material | | Extracted Plant Material | | Extract | |
| --- | --- | --- | --- | --- | --- | --- |
|  | Percent by Mass | Percent by Cannabinoid Content | Percent by Mass | Percent by Cannabinoid Content | Percent by Mass | Percent by Cannabinoid Content |
| CBDA | 6.60% | 86.5% | 0.00% | 0.00% | 0.92% | 1.33% |
| CBD | 0.26% | 3.41% | 0.46% | 100% | 60.9% | 88.2% |
| THCA | 0.18% | 2.36% | 0.00% | 0.00% | 0.00% | 0.00% |
| THC | 0.00% | 0.00% | 0.00% | 0.00% | 1.95% | 2.82% |
| CBGA | 0.18% | 2.36% | * | * | 0.00% | 0.00% |
| CBG | 0.00% | 0.00% | * | * | 1.40% | 2.03% |
| CBCA | 0.41% | 5.37% | * | * | 0.00% | 0.00% |
| CBC | 0.00% | 0.00% | * | * | 3.91% | 5.66% |
| CBNA | 0.00% | 0.00% | * | * | 0.00% | 0.00% |
| CBN | 0.00% | 0.00% | * | * | 0.00% | 0.00% |
| Δ8THC | 0.00% | 0.00% | * | * | 0.00% | 0.00% |
| Total | 7.63% | 100% | 0.46% | 100% | 69.0% | 100% |

94.1% CBD Extraction Yield
100% THC Extraction Yield
98.3% CBD Decarboxylation Efficiency
100% THC Decarboxylation Efficiency
CBDA = cannabidiolic acid
CBD = cannabidiol
THCA = tetrahydrocannabinolic acid
THC = tetrahydrocannabinol
CBGA = cannabigerolic acid
CBG = cannabigerol
CBCA = cannabichromenic acid
CBC = cannabichromene
CBNA = cannabinolic acid
CBN = cannabinol
Δ8THC = delta8-tetrahydrocannabinol
* = not tested

TABLE 3

Simultaneous Distillation and Decarboxylation of Cannabinoids from USDA Organic Industrial Hemp in a 2-Second Process with Measurements Performed by Third Party ISO/IEC 17025 Accredited Cannabinoid-Testing Laboratories

|  | Raw Plant Material | | Extracted Plant Material | | Extract | |
| --- | --- | --- | --- | --- | --- | --- |
|  | Percent by Mass | Percent by Cannabinoid Content | Percent by Mass | Percent by Cannabinoid Content | Percent by Mass | Percent by Cannabinoid Content |
| CBDA | 6.44% | 85.4% | 0.00% | 0.00% | 0.32% | 0.41% |
| CBD | 0.11% | 1.46% | 1.00% | 100% | 69.9% | 89.9% |
| THCA | 0.30% | 3.98% | 0.00% | 0.00% | 0.00% | 0.00% |
| THC | 0.00% | 0.00% | 0.00% | 0.00% | 2.33% | 3.00% |
| CBGA | 0.27% | 3.58% | 0.00% | 0.00% | 0.00% | 0.00% |
| CBG | 0.00% | 0.00% | 0.00% | 0.00% | 1.37% | 1.76% |
| CBCA | 0.42% | 5.57% | 0.00% | 0.00% | 0.00% | 0.00% |
| CBC | 0.00% | 0.00% | 0.00% | 0.00% | 3.61% | 4.65% |

TABLE 3-continued

Simultaneous Distillation and Decarboxylation of Cannabinoids from USDA Organic Industrial Hemp in a 2-Second Process with Measurements Performed by Third Party ISO/IEC 17025 Accredited Cannabinoid-Testing Laboratories

| | Raw Plant Material | | Extracted Plant Material | | Extract | |
|---|---|---|---|---|---|---|
| | Percent by Mass | Percent by Cannabinoid Content | Percent by Mass | Percent by Cannabinoid Content | Percent by Mass | Percent by Cannabinoid Content |
| CBNA | 0.00% | 0.00% | 0.00% | 0.00% | 0.00% | 0.00% |
| CBN | 0.00% | 0.00% | 0.00% | 0.00% | 0.19% | 0.24% |
| Δ8THC | 0.00% | 0.00% | 0.00% | 0.00% | 0.00% | 0.00% |
| Total | 7.54% | 100% | 1.00% | 100% | 77.7% | 100% |

86.6% CBD Extraction Yield
100% THC Extraction Yield
99.5% CBD Decarboxylation Efficiency
100% THC Decarboxylation Efficiency
CBDA = cannabidiolic acid
CBD = cannabidiol
THCA = tetrahydrocannabinolic acid
THC = tetrahydrocannabinol
CBGA = cannabigerolic acid
CBG = cannabigerol
CBCA = cannabichromenic acid
CBC = cannabichromene
CBNA = cannabinolic acid
CBN = cannabinol
Δ8THC = delta8-tetrahydrocannabinol

What is claimed is:

1. A method to produce a product comprising a cannabinoid, comprising:
   (a) providing a composition comprising cannabinoids, wherein (i) the composition has a surface area, (ii) the composition comprises less than 15 percent water by weight, (iii) the composition comprises an oil, (iv) the oil comprises the cannabinoids, (v) the cannabinoids comprise a native cannabinoid molecule, (vi) the native cannabinoid molecule comprises a carboxyl group, (vii) the native cannabinoid molecule is tetrahydrocannabinolic acid (THCA), (viii) the composition comprises at least 5 percent by weight of the cannabinoids, which are selected from tetrahydrocannabinolic acid (THCA), cannabidiolic acid (CBDA), tetrahydrocannabivarin carboxylic acid (THCVA), tetrahydrocannabinol (THC), cannabidiol (CBD), and tetrahydrocannabivarin (THCV), and (ix) the composition comprises at least 1 percent by weight tetrahydrocannabinolic acid (THCA);
   (b) contacting the composition with a heated surface and exposing the surface area of the composition to a vacuum to convert the native cannabinoid molecule into a modified cannabinoid molecule in a gas phase, wherein (x) contacting the composition with the heated surface heats the cannabinoids of the composition by conduction, and (xi) the modified cannabinoid molecule is tetrahydrocannabinol (THC);
   (c) condensing the modified cannabinoid molecule into a condensed cannabinoid molecule in a distillate, wherein (xii) the condensed cannabinoid molecule is tetrahydrocannabinol (THC); and
   (d) collecting the distillate.

2. The method of claim 1, wherein:
the distillate comprises condensed cannabinoids selected from tetrahydrocannabinol (THC), tetrahydrocannabivarin (THCV), cannabidiol (CBD), and cannabinol (CBN);
the condensed cannabinoids comprise tetrahydrocannabinol (THC) and cannabinol (CBN); and
the condensed cannabinoids comprise less than 2 percent cannabinol (CBN) by weight.

3. The method of claim 1, wherein:
the distillate comprises condensed cannabinoids selected from tetrahydrocannabinol (THC), tetrahydrocannabivarin (THCV), cannabidiol (CBD), and cannabinol (CBN);
the composition comprises a starting proportion of cannabinol (CBN) to the cannabinoids of the composition;
the distillate comprises an ending proportion of cannabinol (CBN) to the condensed cannabinoids; and
the method is performed to result in a ratio of the starting proportion to the ending proportion that is greater than 1:2.

4. The method of claim 1, comprising:
providing a vaporizer cartridge comprising a chamber and a heating element; and
filling the chamber of the vaporizer cartridge with at least a portion of the distillate to create thermal communication between the heating element and the portion of the distillate.

5. The method of claim 1, comprising providing a distillation apparatus, wherein:
the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis*; and
heating the cannabinoids of the composition by conduction comprises contacting the composition with sufficient energy to convert the native cannabinoid molecule into (A) a carbon dioxide molecule and (B) the modified cannabinoid molecule in the gas phase.

6. The method of claim 1, comprising providing a distillation apparatus, wherein:

the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis;*
heating the cannabinoids of the composition by conduction comprises contacting the composition with sufficient energy to convert the native cannabinoid molecule into (A) a carbon dioxide molecule and (B) the modified cannabinoid molecule in the gas phase; and
the distillate comprises cannabinol (CBN) at a concentration of less than 2 percent by weight.

7. The method of claim 1, comprising providing a distillation apparatus, wherein:
the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis;*
heating the cannabinoids of the composition by conduction comprises contacting the composition with sufficient energy to convert the native cannabinoid molecule into (A) a carbon dioxide molecule and (B) the modified cannabinoid molecule in the gas phase;
the gas phase lacks sulfur dioxide at a concentration greater than 5 parts per million by volume;
the distillate comprises one or both of cannabidiol and tetrahydrocannabinol at a combined concentration of greater than 60 percent by weight; and
the distillate comprises cannabinol (CBN) at a concentration of less than 1 percent by weight.

8. The method of claim 1, comprising providing a distillation apparatus, wherein:
the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis;*
heating the cannabinoids of the composition by conduction comprises contacting the composition with sufficient energy to convert the native cannabinoid molecule into (A) a carbon dioxide molecule and (B) the modified cannabinoid molecule in the gas phase;
the gas phase lacks sulfur dioxide at a concentration greater than 5 parts per million by volume;
the distillate comprises one or both of cannabidiol (CBD) and tetrahydrocannabinol (THC) at a combined concentration of greater than 60 percent by weight; and
the distillate comprises cannabinol (CBN) at a concentration of less than 0.5 percent by weight.

9. The method of claim 1, comprising providing a distillation apparatus, wherein:
the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis;*
heating the cannabinoids of the composition by conduction comprises contacting the composition with sufficient energy to convert the native cannabinoid molecule into (A) a carbon dioxide molecule and (B) the modified cannabinoid molecule in the gas phase;
the gas phase lacks sulfur dioxide at a concentration greater than 5 parts per million by volume;
the distillate comprises one or both of cannabidiol (CBD) and tetrahydrocannabinol (THC) at a combined concentration of greater than 60 percent by weight; and
the distillate comprises cannabinol (CBN) at a concentration of less than 0.2 percent by weight.

10. The method of claim 1, comprising providing a distillation apparatus, wherein:
the distillation apparatus is a thin-film evaporator and/or a short-path distillation apparatus;
the heated surface is a surface of the distillation apparatus;
contacting the composition with the heated surface comprises coating the heated surface with the composition;
the oil is an extracted oil from the genus *Cannabis;*
heating the cannabinoids of the composition by conduction comprises contacting the composition with sufficient energy to convert the native cannabinoid molecule into (A) a carbon dioxide molecule and (B) the modified cannabinoid molecule in the gas phase;
condensing the modified cannabinoid molecule into a condensed cannabinoid molecule comprises contacting the modified cannabinoid molecule with a heat sink;
contacting the modified cannabinoid molecule with the heat sink comprises directing the modified cannabinoid molecule through a fluid-cooled condenser;
the method comprises contacting the modified cannabinoid molecule with the heat sink and condensing the modified cannabinoid molecule into the condensed cannabinoid molecule less than 360 seconds after contacting the composition with the sufficient energy;
the gas phase lacks sulfur dioxide at a concentration greater than 5 parts per million by volume;
the distillate comprises one or both of cannabidiol (CBD) and tetrahydrocannabinol (THC) at a combined concentration of greater than 60 percent by weight; and
the distillate comprises cannabinol (CBN) at a concentration of less than 0.1 percent by weight.

11. The method of claim 1, wherein:
the distillate comprises one or both of cannabidiol (CBD) and tetrahydrocannabinol (THC) at a combined concentration of greater than 70 percent by weight; and
the distillate comprises cannabinol (CBN) at a concentration of less than 0.5 percent by weight.

12. The method of claim 1, wherein:
the distillate comprises one or both of cannabidiol (CBD) and tetrahydrocannabinol (THC) at a combined concentration of greater than 60 percent by weight; and
the distillate comprises cannabinol (CBN) at a concentration of less than 0.5 percent by weight.

13. The method of claim 1, wherein:
the distillate comprises one or both of cannabidiol (CBD) and tetrahydrocannabinol (THC) at a combined concentration of greater than 70 percent by weight; and
the distillate comprises cannabinol (CBN) at a concentration of less than 0.2 percent by weight.

14. The method of claim 1, wherein:
the distillate comprises one or both of cannabidiol (CBD) and tetrahydrocannabinol (THC) at a combined concentration of greater than 60 percent by weight; and
the distillate comprises cannabinol (CBN) at a concentration of less than 0.2 percent by weight.

15. A method to produce a product comprising a cannabinoid, comprising:
(a) providing a composition comprising cannabinoids, wherein (i) the composition has a surface area, (ii) the composition comprises less than 15 percent water by weight, (iii) the composition comprises an oil, (iv) the oil comprises the cannabinoids, (v) the cannabinoids comprise a native cannabinoid molecule, (vi) the native cannabinoid molecule comprises a carboxyl group, (vii) the native cannabinoid molecule is tetrahydrocannabinolic acid (THCA), (viii) the composition comprises at least 5 percent by weight of the cannabinoids, which are selected from tetrahydrocannabinolic acid (THCA), cannabidiolic acid (CBDA), tetrahydrocannabivarin carboxylic acid (THCVA), tetrahydrocannabinol (THC), cannabidiol (CBD), and tetrahydrocannabivarin (THCV), and (ix) the composition comprises at least 1 percent by weight tetrahydrocannabinolic acid (THCA);
- (b) contacting the composition with a heated surface and exposing the surface area of the composition to a vacuum to convert the native cannabinoid molecule into a modified cannabinoid molecule in a gas phase, wherein (x) contacting the composition with the heated surface heats the cannabinoids of the composition by conduction, and (xi) the modified cannabinoid molecule is tetrahydrocannabinol (THC);
- (c) condensing the modified cannabinoid molecule into a condensed cannabinoid molecule in a distillate less than 360 seconds after converting the native cannabinoid molecule into the modified cannabinoid molecule in the gas phase, wherein (xii) the condensed cannabinoid molecule is tetrahydrocannabinol (THC); and
- (d) collecting the distillate.

16. The method of claim 15, wherein:
the distillate comprises condensed cannabinoids selected from tetrahydrocannabinol (THC), cannabidiol (CBD), tetrahydrocannabivarin (THCV), and cannabinol (CBN); and
the condensed cannabinoids comprise less than 2 percent cannabinol (CBN) as a percentage by weight of the condensed cannabinoids.

17. The method of claim 15, comprising:
providing a vaporizer cartridge comprising a chamber and a heating element; and
filling the chamber of the vaporizer cartridge with at least a portion of the distillate to create thermal communication between the heating element and the portion of the distillate.

18. A method to produce a product comprising a cannabinoid, comprising:
- (a) providing a distillation apparatus, wherein (i) the distillation apparatus is a thin-film evaporator and/or a short-path distillation apparatus;
- (b) providing a composition comprising cannabinoids, wherein (ii) the composition has a surface area, (iii) the composition comprises less than 15 percent water by weight, (iv) the composition comprises an oil, (v) the oil comprises the cannabinoids, (vi) the oil is an extracted oil from the genus *Cannabis*, (vii) the cannabinoids comprise a native cannabinoid molecule, (viii) the native cannabinoid molecule comprises a carboxyl group, (ix) the native cannabinoid molecule is tetrahydrocannabinolic acid (THCA), (x) the composition comprises at least 5 percent by weight of the cannabinoids, which are selected from tetrahydrocannabinolic acid (THCA), cannabidiolic acid (CBDA), tetrahydrocannabivarin carboxylic acid (THCVA), tetrahydrocannabinol (THC), cannabidiol (CBD), and tetrahydrocannabivarin (THCV), and (xi) the composition comprises at least 1 percent by weight tetrahydrocannabinolic acid (THCA);
- (c) contacting the composition with a heated surface and exposing the surface area of the composition to a vacuum to convert the native cannabinoid molecule into a modified cannabinoid molecule in a gas phase, wherein (xii) the heated surface is a surface of the distillation apparatus, (xiii) contacting the composition with the heated surface comprises coating the heated surface with the composition, (xiv) contacting the composition with the heated surface heats the cannabinoids of the composition by conduction, (xv) heating the cannabinoids of the composition by conduction comprises contacting the composition with sufficient energy to convert the native cannabinoid molecule into (A) a carbon dioxide molecule and (B) the modified cannabinoid molecule in the gas phase, and (xvi) the modified cannabinoid molecule is tetrahydrocannabinol (THC);
- (d) condensing the modified cannabinoid molecule into a condensed cannabinoid molecule in a distillate less than 360 seconds after converting the native cannabinoid molecule into the modified cannabinoid molecule in the gas phase, wherein (xvii) the condensed cannabinoid molecule is tetrahydrocannabinol (THC); and
- (e) collecting the distillate.

19. The method of claim 18, wherein:
the distillate comprises condensed cannabinoids selected from tetrahydrocannabinol (THC), cannabidiol (CBD), tetrahydrocannabivarin (THCV), and cannabinol (CBN); and
the condensed cannabinoids comprise less than 2 percent cannabinol (CBN) as a percentage by weight of the condensed cannabinoids.

20. The method of claim 18, comprising:
providing a vaporizer cartridge comprising a chamber and a heating element; and
filling the chamber of the vaporizer cartridge with at least a portion of the distillate to create thermal communication between the heating element and the portion of the distillate.

* * * * *